(12) United States Patent
Jones

(10) Patent No.: US 10,250,792 B2
(45) Date of Patent: Apr. 2, 2019

(54) UNMANNED AERIAL VEHICLES, VIDEOGRAPHY, AND CONTROL METHODS

(71) Applicant: PLATYPUS IP L.L.C., Salt Lake City, UT (US)

(72) Inventor: David Allan Jones, Salt Lake City, UT (US)

(73) Assignee: Platypus IP PLLC, Salt Lake City, UT (US)

( * ) Notice: Subject to any disclaimer, the term of this patent is extended or adjusted under 35 U.S.C. 154(b) by 123 days.

(21) Appl. No.: 15/347,725

(22) Filed: Nov. 9, 2016

(65) Prior Publication Data

US 2017/0099424 A1  Apr. 6, 2017

(51) Int. Cl.
   *H04N 7/18*   (2006.01)
   *H04N 5/232*  (2006.01)
   (Continued)

(52) U.S. Cl.
   CPC ........... *H04N 5/23203* (2013.01); *A63B 6/02* (2013.01); *A63B 69/0048* (2013.01); *A63B 71/0622* (2013.01); *B64C 39/024* (2013.01); *B64D 47/08* (2013.01); *G05D 1/12* (2013.01); *G06F 3/012* (2013.01); *G06T 7/73* (2017.01); *H04N 5/23216* (2013.01); *H04N 5/23293* (2013.01);
   (Continued)

(58) Field of Classification Search
   CPC ... A63B 69/0048; A63B 6/02; A63B 71/0622; H04N 5/23203; H04N 5/23293; H04N 5/23216; B64C 39/024; B64C 2201/127; G05D 1/12; G06F 3/012; B64D 47/08; G06T 7/73; G06T 2207/10032; G06T 2207/10016; G06T 2207/30232
   See application file for complete search history.

(56) References Cited

U.S. PATENT DOCUMENTS

| | | | |
|---|---|---|---|
| 5,552,983 A | 9/1996 | Thornberg et al. | |
| 5,581,250 A | 12/1996 | Khvilivitzky | |

(Continued)

FOREIGN PATENT DOCUMENTS

| | | |
|---|---|---|
| EP | 2364757 A1 | 9/2011 |
| WO | 2009/109711 A2 | 9/2009 |
| WO | 2010061099 A2 | 6/2010 |

*Primary Examiner* — Howard D Brown, Jr.
(74) *Attorney, Agent, or Firm* — Alpine IP PLLC; David A Jones

(57) ABSTRACT

Videography of climbing surfaces and improved positional control of unmanned aerial vehicles (UAV) are disclosed. Currently, videography using UAVs (e.g. drones) avoid vertical structures. Rather, such drones are designed to navigate open aerial spaces. For example, UAVs often include sensors and piloting programming to avoid vertical walls. In climbing scenarios, however, a UAV provides improved videography of the vertical surface as described herein. As such, attributes of a vertical, semi-vertical, or non-uniform vertical surface can be recognized by a UAV. These surface attributes can be used to pilot and/or control a UAV. In certain embodiments, a transmitter is disposed on the climber, a normal climbing surface vector is determined, and UAV control settings are generated thereby to position the UAV. And, improved communication can be provided so as to relay real-time video capture of climbing activity to one or more persons on the ground.

20 Claims, 16 Drawing Sheets

(51) Int. Cl.
  *A63B 69/00* (2006.01)
  *A63B 71/06* (2006.01)
  *G06T 7/73* (2017.01)
  *G06F 3/01* (2006.01)
  *B64C 39/02* (2006.01)
  *B64D 47/08* (2006.01)
  *G05D 1/12* (2006.01)
  *A63B 6/02* (2006.01)

(52) U.S. Cl.
  CPC ............... *B64C 2201/127* (2013.01); *G06T 2207/10016* (2013.01); *G06T 2207/10032* (2013.01); *G06T 2207/30232* (2013.01)

(56) References Cited

U.S. PATENT DOCUMENTS

| | | | |
|---|---|---|---|
| 7,228,232 B2 | 6/2007 | Bodin et al. | |
| 8,214,088 B2 | 7/2012 | Lefebure | |
| 8,594,862 B2 | 11/2013 | Callou et al. | |
| 9,164,506 B1 * | 10/2015 | Zang | G05D 1/0038 |
| 2007/0271032 A1 * | 11/2007 | Cheng | G01S 5/0294 |
| | | | 701/2 |
| 2012/0287274 A1 * | 11/2012 | Bevirt | H04N 7/185 |
| | | | 348/144 |
| 2014/0166816 A1 * | 6/2014 | Levien | B64C 39/024 |
| | | | 244/175 |
| 2014/0334668 A1 * | 11/2014 | Saund | G06T 7/20 |
| | | | 382/103 |
| 2015/0109457 A1 * | 4/2015 | Stout | H04N 5/222 |
| | | | 348/169 |
| 2015/0116505 A1 * | 4/2015 | Stout | H04N 5/222 |
| | | | 348/169 |
| 2015/0277440 A1 * | 10/2015 | Kimchi | G01S 17/08 |
| | | | 701/26 |
| 2015/0362917 A1 * | 12/2015 | Wang | G05D 1/0022 |
| | | | 701/2 |
| 2016/0054733 A1 * | 2/2016 | Hollida | H04N 5/23293 |
| | | | 701/2 |
| 2016/0054737 A1 * | 2/2016 | Soll | G11B 27/031 |
| | | | 701/3 |
| 2016/0139602 A1 * | 5/2016 | Kohstall | G05D 1/101 |
| | | | 701/3 |
| 2016/0304217 A1 * | 10/2016 | Fisher | B60L 11/1809 |
| 2017/0061813 A1 * | 3/2017 | Tao | G09B 9/08 |
| 2017/0371353 A1 * | 12/2017 | Millinger, III | G05D 1/101 |
| 2018/0157259 A1 * | 6/2018 | Myslinski | G08B 21/18 |
| 2018/0158197 A1 * | 6/2018 | Dasgupta | H04N 13/243 |

* cited by examiner

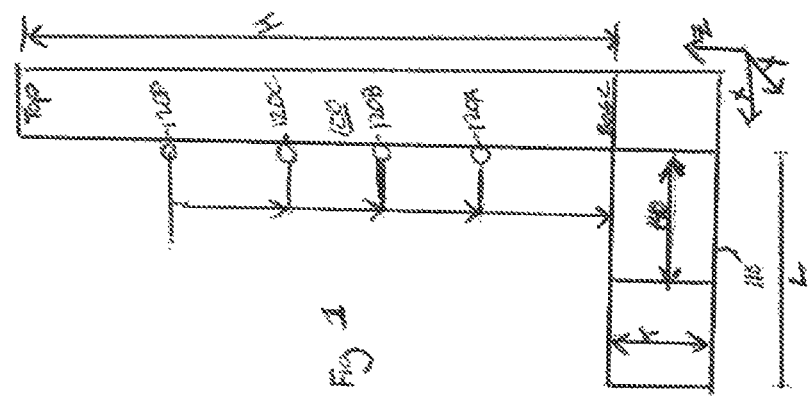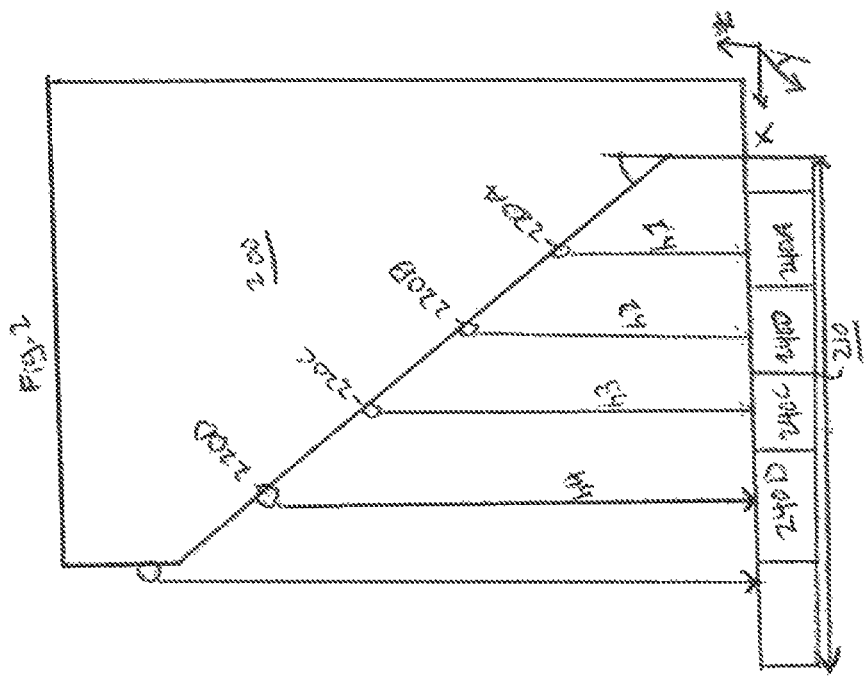

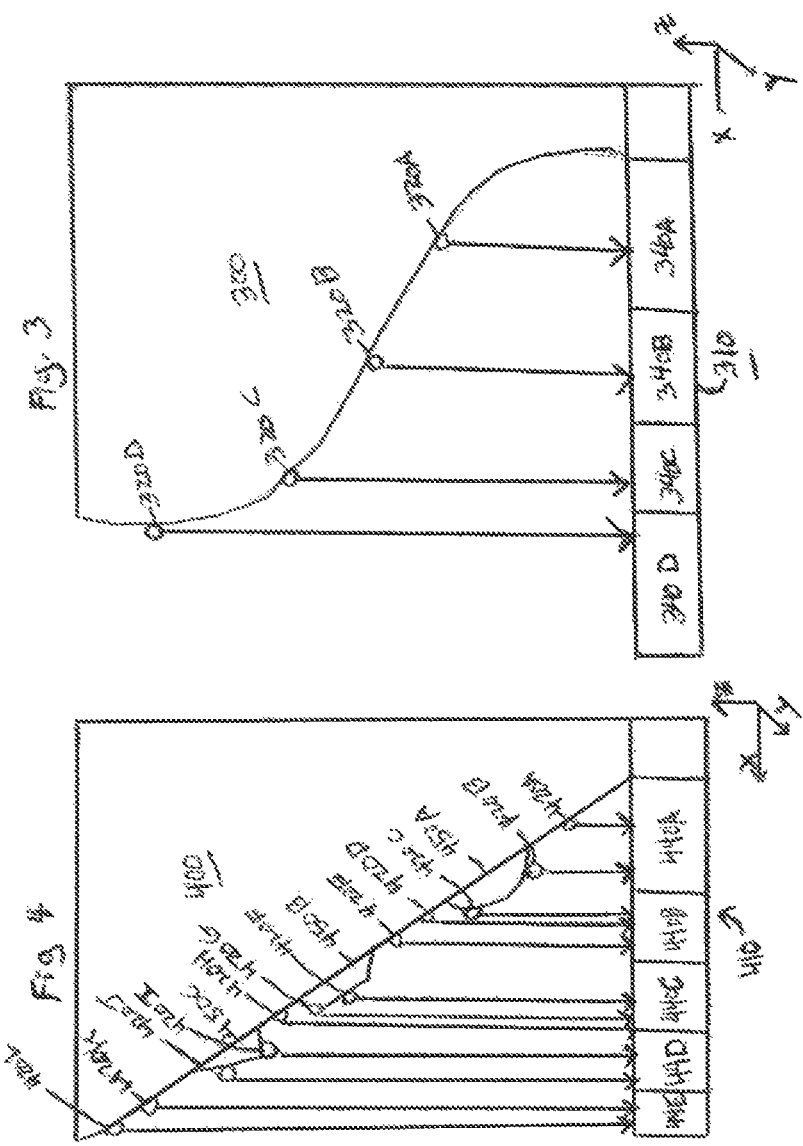

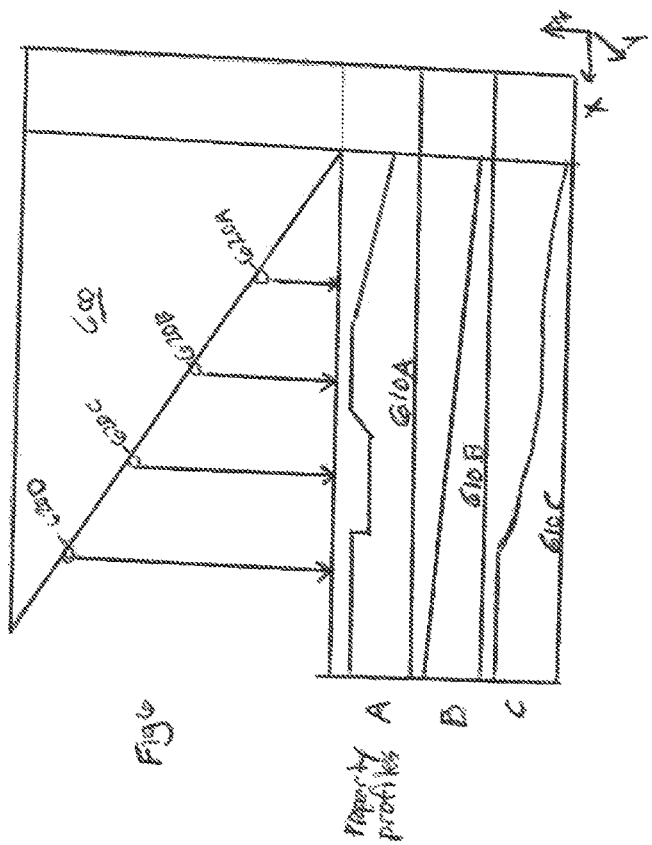
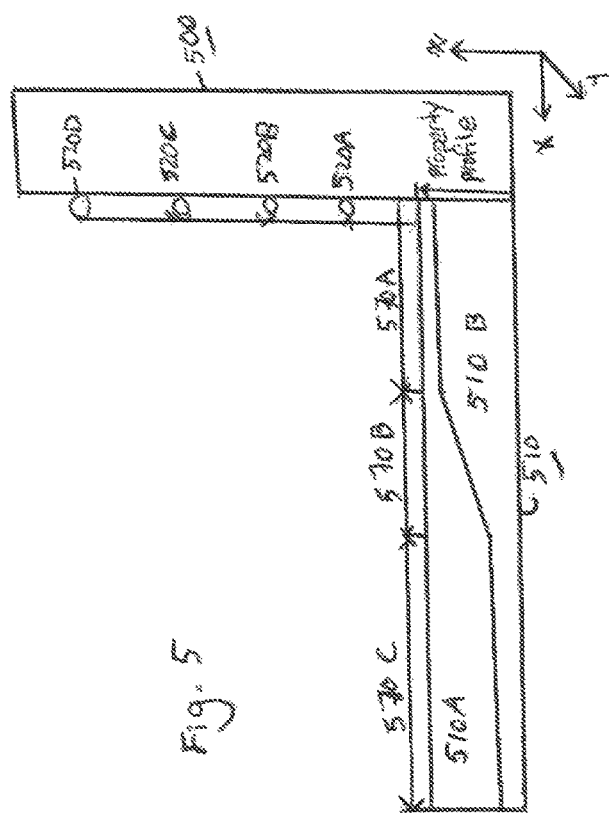

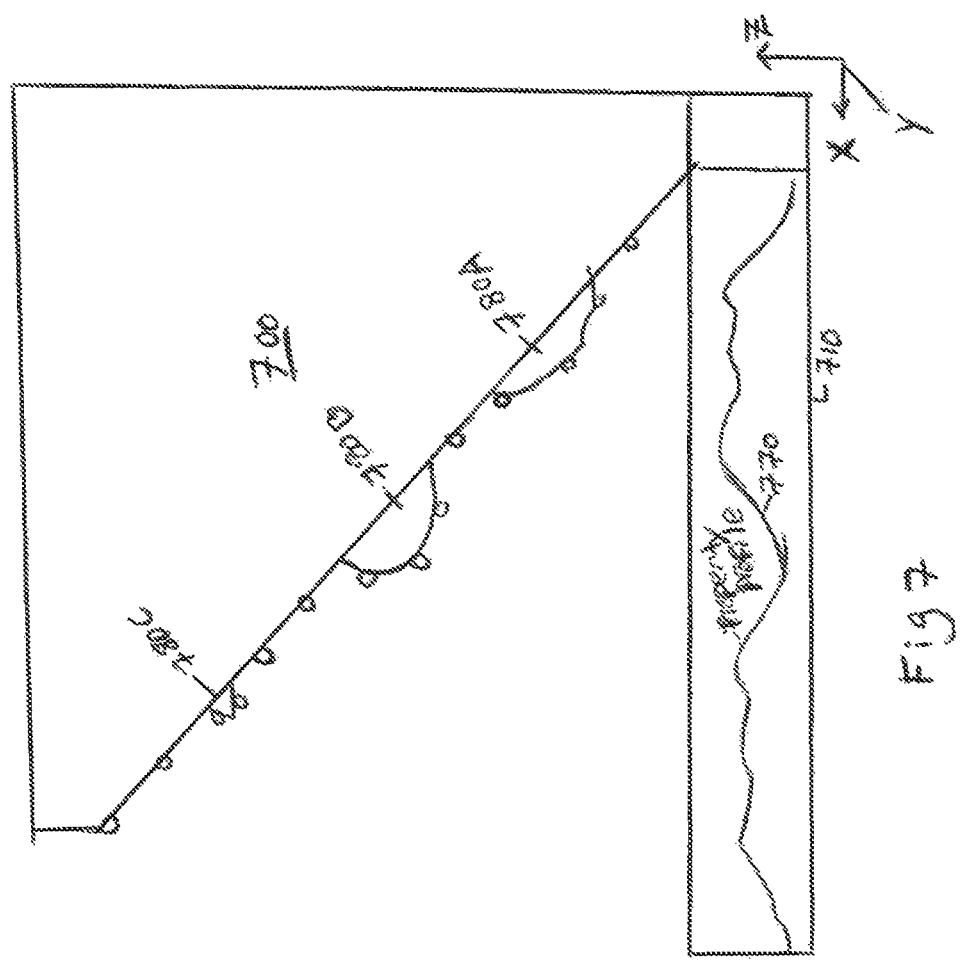

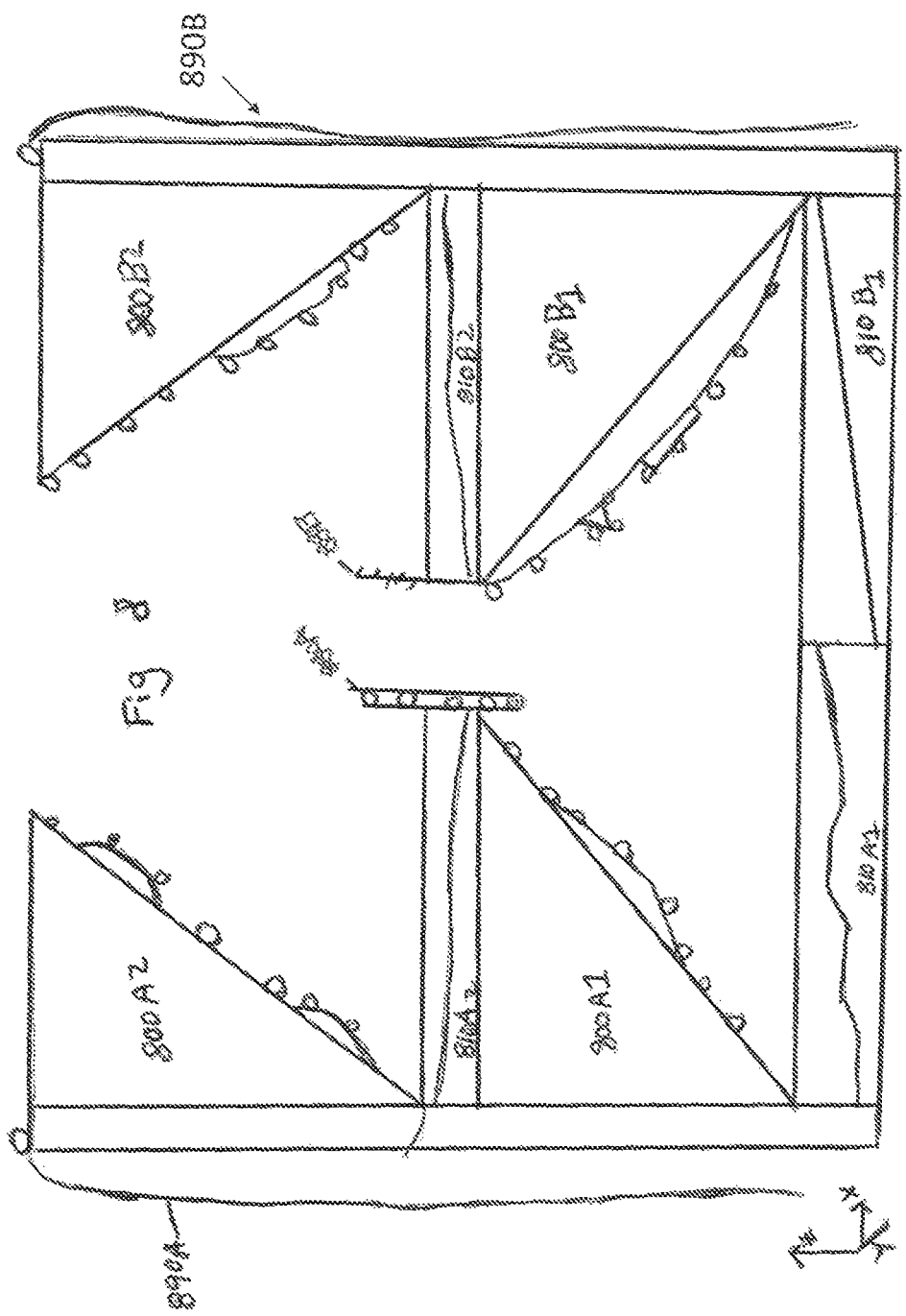

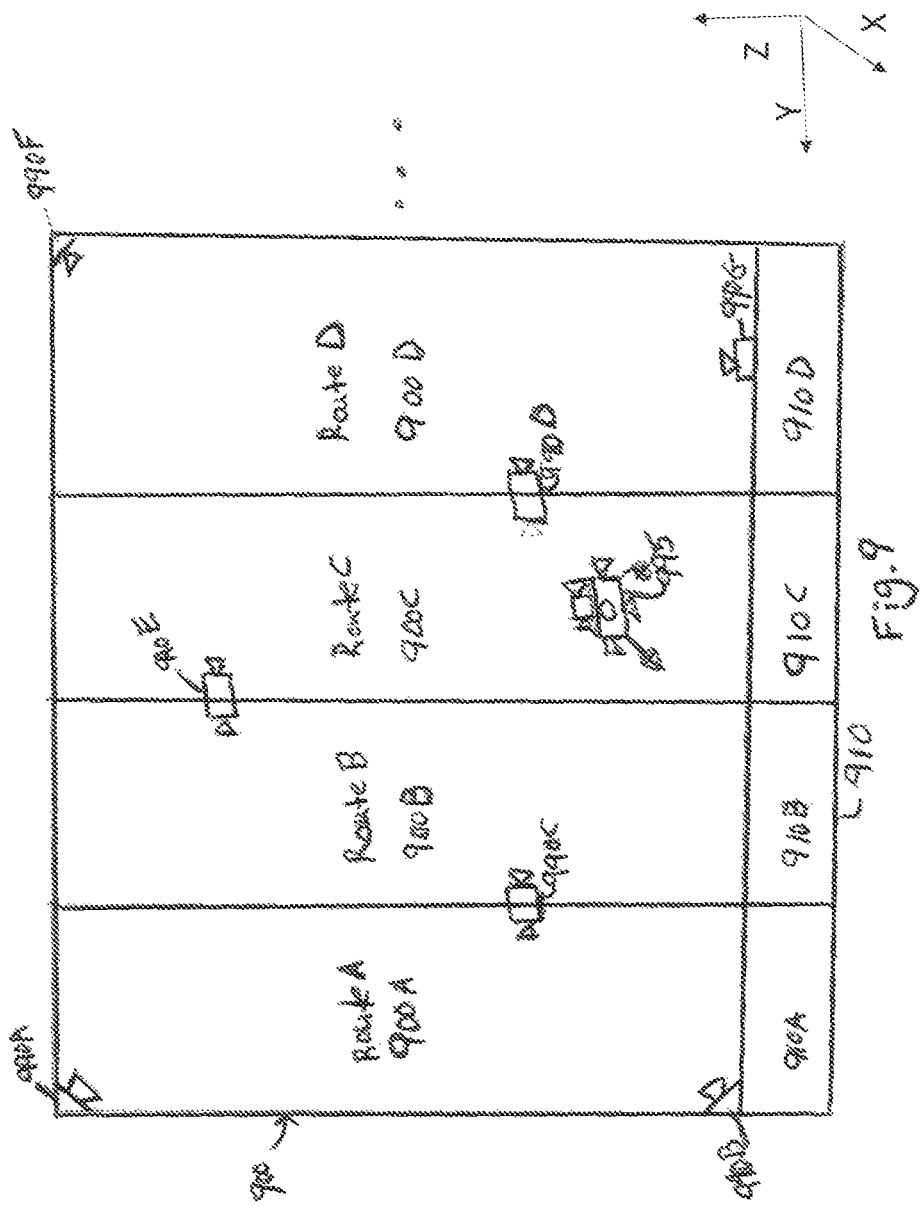

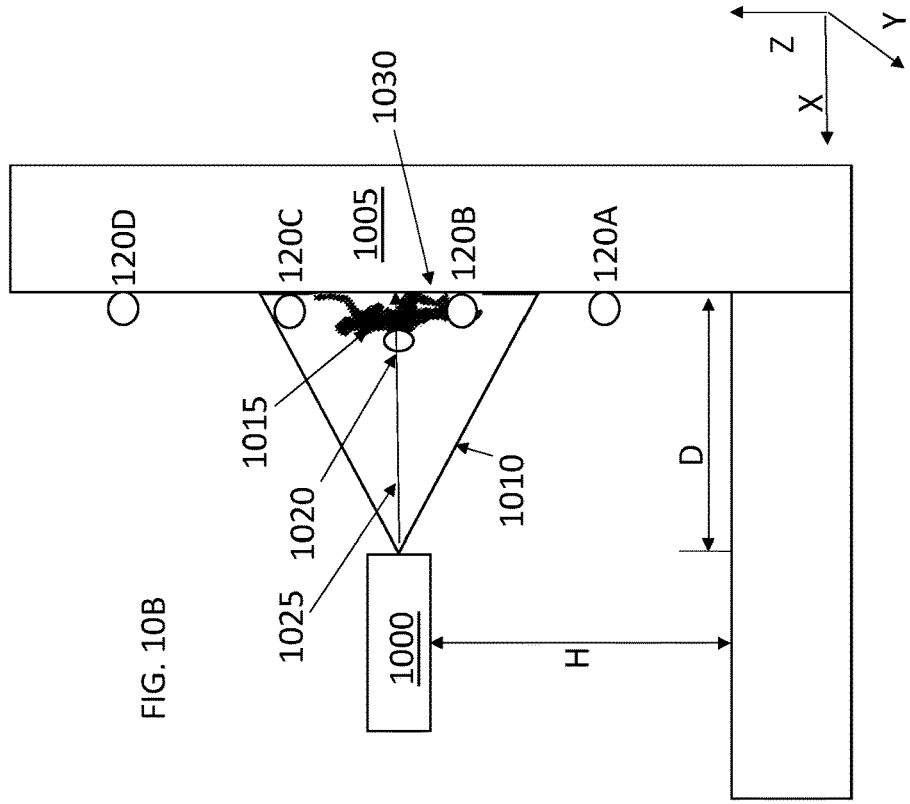
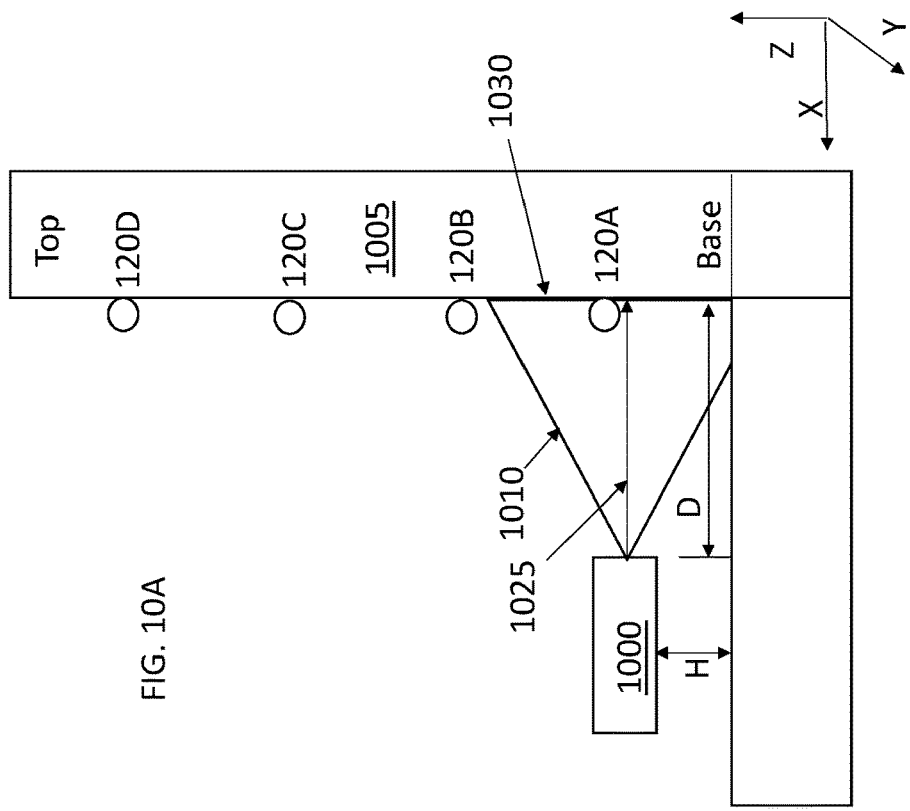

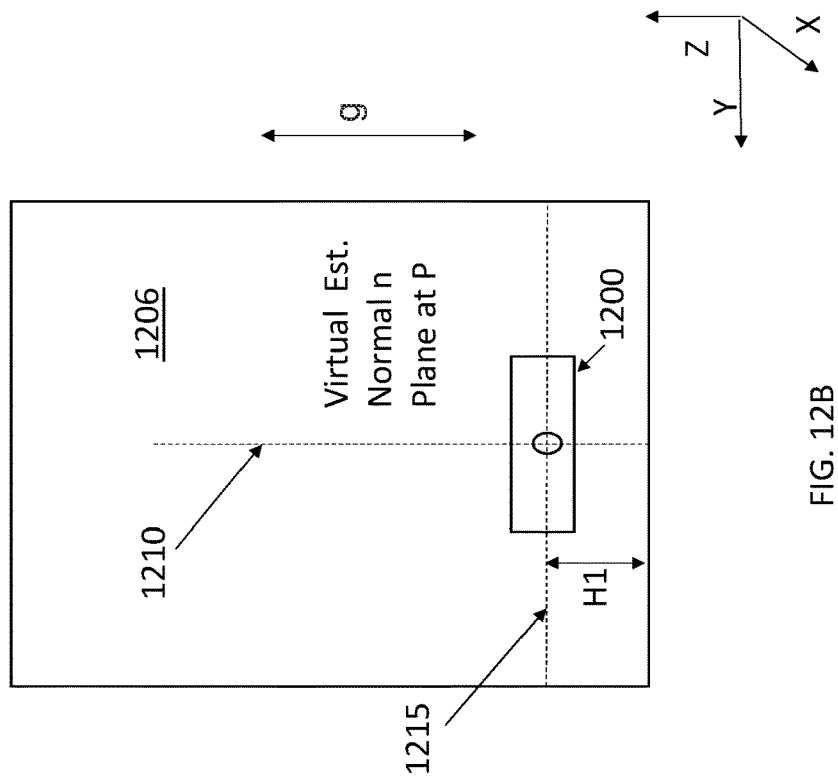
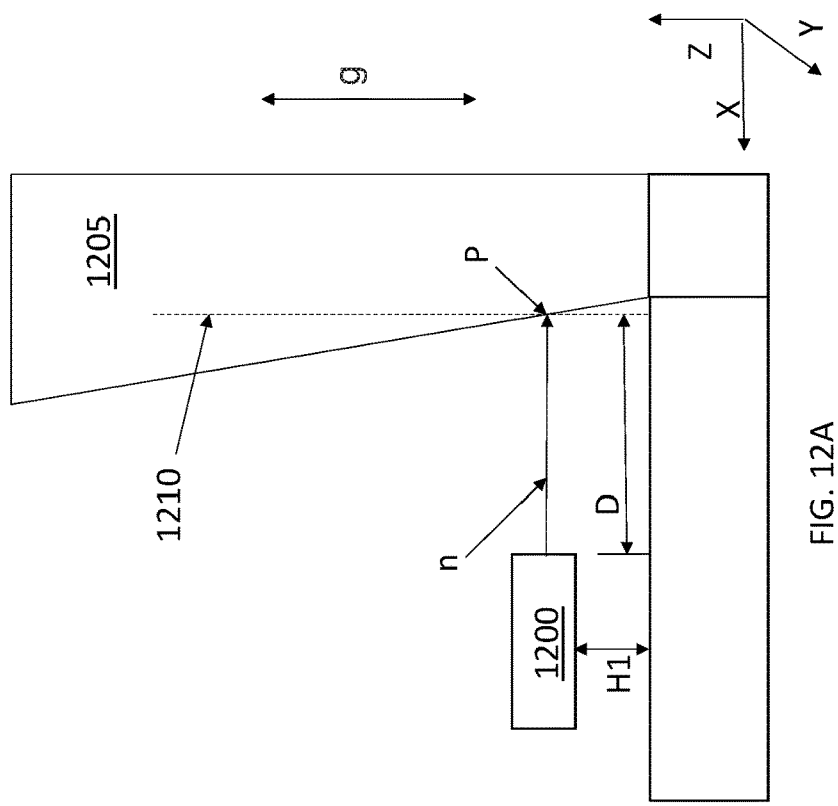

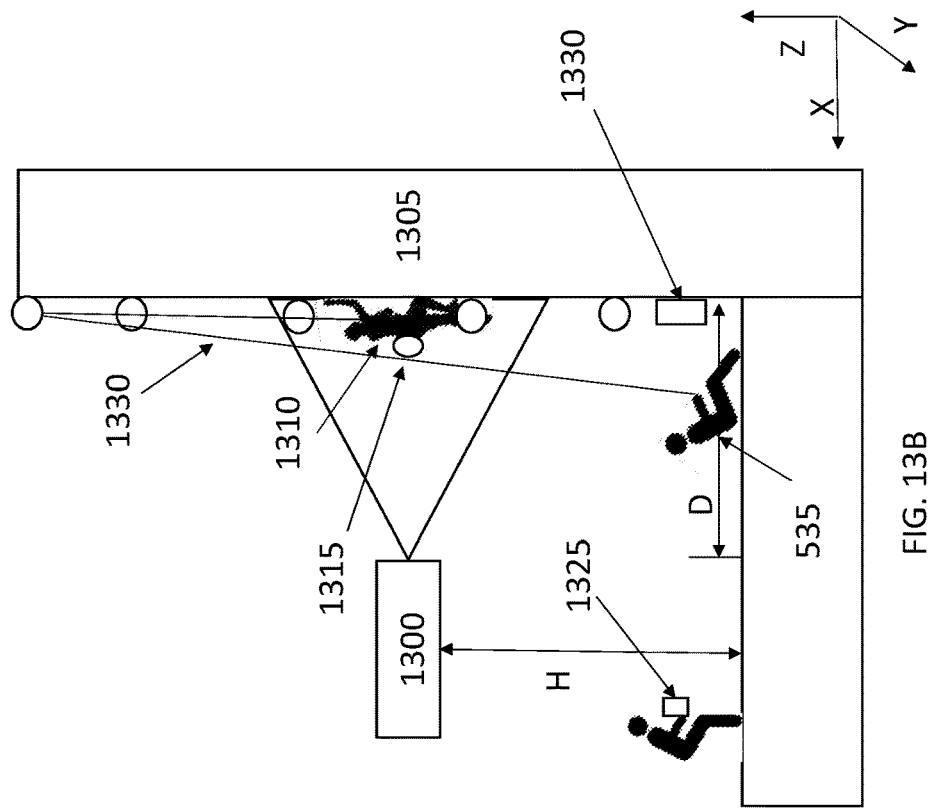
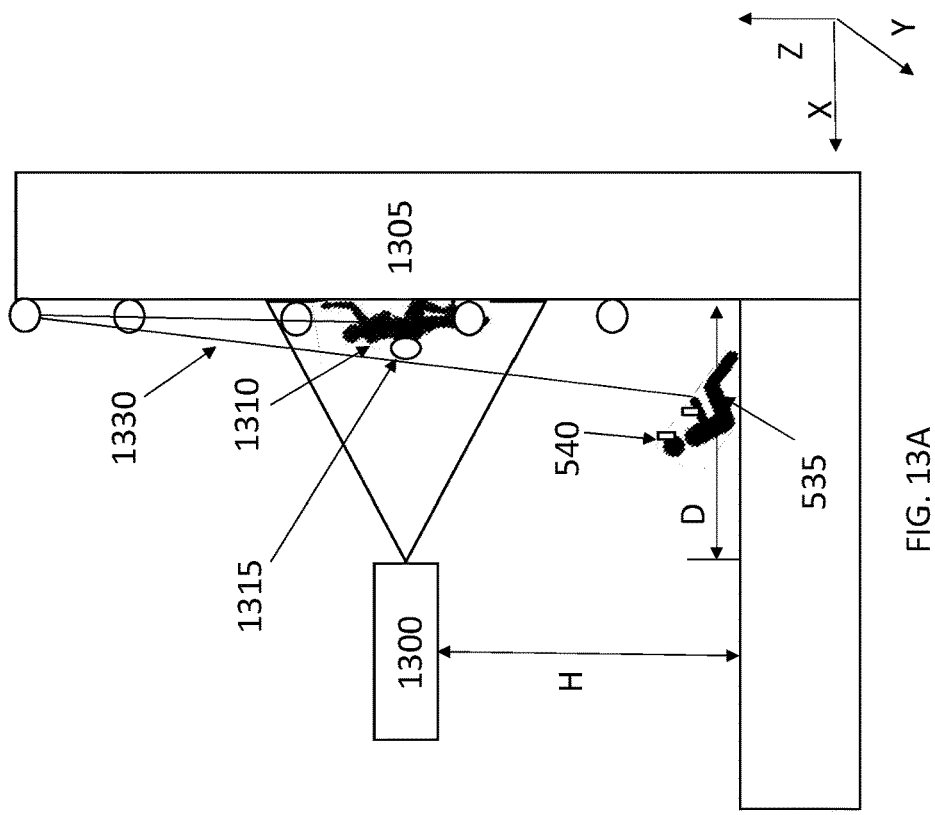

UNMANNED AERIAL VEHICLES, VIDEOGRAPHY, AND CONTROL METHODS

CROSS-REFERENCE TO RELATED APPLICATIONS

This application is related to U.S. patent application Ser. No. 14/822,631 filed Aug. 10, 2015, the contents of which are hereby incorporated herein by reference.

BACKGROUND

Rock climbing first emerged as a sport in the mid-1800s. Early records describe climbers engaging in what is now referred to as bouldering, not as a separate discipline, but as a form of training for larger ascents. In the early 20th century, the Fontainebleau area of France established itself as a prominent climbing area, where some of the first dedicated bleausards (or "boulderers") emerged. The specialized rock climbing shoe was invented by one such athlete, Pierre Allain.

In the 1960s, the sport was pushed forward by American mathematician John Gill, who contributed several important innovations. Gill's previous athletic pursuit was gymnastics, a sport which had an established scale of difficulty for particular movements and body positions. He applied this idea to bouldering, which shifted the focus from reaching a summit to navigating a specific sequence of holds. Gill developed a closed-ended rating system: B1 problems were as difficult as the most challenging roped routes of the time, B2 problems were more difficult, and B3 problems were those that had only been completed once.

Two important training tools emerged in the 1980s: Bouldering mats and artificial climbing walls. The former, also referred to as "crash pads," prevented injuries from falling, and enabled boulderers to climb in areas that would have been too dangerous to attempt otherwise. Indoor climbing walls helped spread the sport to areas without outdoor climbing, and allowed serious climbers to train year-round regardless of weather conditions.

As the sport grew in popularity, new bouldering areas were developed throughout Europe and the United States, and more athletes began participating in bouldering competitions. The visibility of the sport greatly increased in the early 2000s, as YouTube videos and climbing blogs helped boulderers around the world to quickly learn techniques, find hard problems, and announce newly completed projects.

In early 2010, two American climbers claimed first ascents on boulder problems that have come to be regarded as the most difficult in the world: The Game near Boulder, Colo., established by Daniel Woods; and Lucid Dreaming near Bishop, Calif., established by Paul Robinson. The following year, fellow American Carlo Traversi claimed the second ascent of The Game and in January 2014, American Daniel Woods completed the second ascent of "Lucid Dreaming." In 2011, Czech climber Adam Ondra claimed the second ascent of Gioia, originally established three years earlier by Italian boulderer Christian Core, and suggested that it was among the world's most challenging boulder problems.

Unlike other climbing sports, bouldering can be performed safely and effectively with very little equipment, an aspect which makes the discipline highly appealing to many climbers.

Bouldering is a form of rock climbing which takes place on boulders and other small rock formations, usually measuring less than 20 feet (6.1 m) from ground to top, but in some cases can measure up to 30+ ft. Unlike top rope climbing and lead climbing, no ropes are used to protect or aid the climber. Bouldering routes or "problems" require the climber to reach the top of a boulder, usually from a specified start position. Some boulder problems, known as "traverses," require the climber to climb horizontally from one position to another.

Bouldering movements are described as either "static" or "dynamic" which can add to the level of skill required, and/or likelihood of falling, using such bouldering movements. Static movements are those that are performed slowly, with the climber's position controlled by maintaining contact on the boulder with the other three limbs. Dynamic movements use the climber's momentum to reach holds that would be difficult or impossible to secure statically, with an increased risk of falling if the movement is not performed accurately. And, in the case of a bouldering race, dynamic movements may be accentuated over static movements with a corresponding increase of required skill and/or likelihood/frequency of falling as speed, dynamic movement, and/or difficulty of climbing route and holds are increased.

Again, boulder problems are generally (but not always) shorter than 20 feet (6.1 m) from ground to top. And, in a commercial indoor rock climbing wall environment, may be less. This may be so, in particular, with lower-skill, introductory, or younger climbers. The vertically shorter climbing wall (and fall therefrom) makes the sport significantly safer than free solo climbing, which is also performed without ropes, but with no upper limit on the height of the climb. However, minor injuries are common in bouldering, particularly sprained ankles and wrists. Two factors contribute to the frequency of injuries in bouldering: first, boulder problems typically feature more difficult moves than other climbing disciplines, making falls more common. Second, without ropes to arrest the climber's descent, every fall will cause the climber to hit the ground. And, considering a possible miss-hap with traditional top-roped indoor climbing, free solo climbing, and even bouldering—fall impact can vary greatly due to the height at which the un-obstructed fall began.

To prevent injuries, boulderers position crash pads near the base of the boulder to provide a softer landing, as well as one or more spotters to help redirect the climber towards the pads. Upon landing, boulderers employ falling techniques similar to those used in gymnastics: spreading the impact across the entire body to avoid bone fractures, and positioning limbs to allow joints to move freely throughout the impact.

Artificial (i.e. human made, designed, or manufactured) climbing walls are often used to simulate boulder problems in an indoor environment, usually at climbing gyms. These walls are generally constructed with wooden panels, polymer cement panels, concrete shells, or precast molds of actual rock walls. Holds, usually made of plastic, are then bolted onto the wall to create problems. The walls often feature steep overhanging surfaces, forcing the climber to employ highly technical movements while supporting much of their weight with their upper body strength. And, the wall surface can be further complicated by attaching various "volumes" to the wall to which holds are then subsequently attached.

Climbing gyms often feature multiple problems within the same section (or route) of wall. In the US the most common method Routesetters use to designate the intended route for a particular problem is by placing colored tape next to each hold—for example, holds with red tape would indicate one bouldering problem, while green tape would be used to set off a different problem in the same area.

Across much of the rest of the world problems and grades are usually designated by using a set color of plastic hold to indicate a particular problem. For example, green may be v0-v1, blue may be v2-v3 and so on. Setting via color has certain advantages, the most notable of which are that it makes it more obvious where the holds for a problem are, and that there is no chance of tape being accidentally kicked off of footholds. Smaller, resource-poor climbing gyms may prefer taped problems because large, expensive holds can be used in multiple routes simply by marking them with more than one color of tape.

Bouldering competitions occur in both indoor and outdoor settings. There are several other formats used for bouldering competitions. Some competitions give climbers a fixed number of attempts at each problem with a timed rest period in between each attempt, unlike the International Federation of Sport Climbing (IFSC) format, in which competitors can use their allotted time however they choose. In an open-format competition, all climbers compete simultaneously, and are given a fixed amount of time to complete as many problems as possible. More points are awarded for more difficult problems, while points are deducted for multiple attempts on the same problem.

In 2012, the IFSC submitted a proposal to the International Olympic Committee (IOC) to include lead climbing in the 2020 Summer Olympics. The proposal was later revised to an "overall" competition, which would feature bouldering, lead climbing, and speed climbing. In May 2013, the IOC announced that climbing would not be added to the 2020 Olympic program.

Thus, to-date, a rock climbing, or bouldering, pad has had a simple consistent design with common properties across a length and width. Further, climbing walls did not anticipate a varied, and updatable, design of a safety pad. And, variously other desired, but unrecognized problems and advantages addressed by the inventive embodiments and teachings discussed below were not previously addressed or considered.

Regarding drones and other conventional unmanned aerial vehicles (UAVs) have incorporated various means for avoiding collisions with objects. For example, U.S. Pat. No. 5,581,250, the contents of which are hereby incorporated herein, discloses a collision avoidance ability for UAV during its non-VFR pre-programmed autonomous flight that is achieved by using a forward-looking TV camera which senses visual obstacles in direction of flight. The UAV is equipped with an autopilot which is able of maneuvering and incorporated in a form of flight/mission computer's program. An image processor locks and tracks obstacles in the camera's field of view in real time. It provides the autopilot with information about level of threat and generates appropriate commands. Being warned by the TV camera, flight/mission computer initiates appropriate maneuver, in order to avoid possible collision. After that, it returns to interrupted pre-programmed flight. Two forward-looking TV cameras are used to measure a distance between the UAV and the obstacle considering that the level of threat is higher if this distance is less. Another example is U.S. Pat. No. 7,228,232 B2, the contents of which are also incorporated herein by reference.

An additional example of an UAV is a drone with multiple rotors. These multiple rotors can be driven by respective motors in order to pilot the drone attitude-wise and speed wise. One example of such a drone is the AR Drone form Parrot SA, Paris, France, which is a quadricopter equipped with a series of sensors (accelerometers, triaxial gryometers, altimeter) disclosed in WO 2010/0610099 A2 and EP 2 364 757 A1, the contents of which are hereby incorporated by reference herein.

SUMMARY

Embodiments disclosed herein relate to climbing walls, surfaces, fall safety pads and/or accessories as well as methods of design, use, and manufacture thereof. For example, various embodiments disclosed herein relate to unmanned aerial vehicles, such as drones for use with climbing or other vertical surfaces. Other embodiments disclosed herein relate to input, control and display devices related to climbing scenarios and accessories thereto. Various display devices can allow an observer of the climbing or suspended person to keep one or more hands free while monitoring the progress or activities of the climber. A display/input device can be head mounted and can be considered a virtual belay display device also referred to as belay goggles. Other embodiments relate to autonomous, semi-autonomous and feedback controlled UAV methods and apparatus. Certain embodiments include computer software and/or hardware means for controlling the drone or activity of the drone. And, certain methods and apparatus relate to improvements in UAV and/or video control in vertical or semi-vertical introduced environments, such as indoor and outdoor climbing environments.

A method performed by an unmanned aerial vehicle (UAV) for recording imagery of a climber as the climber ascends the climbing surface is disclosed. A method can include receiving a signal from one or more distance sensors of the UAV describing the climbing surface. A method can include determining a horizontal and vertical plane describing the climbing surface. A method can include receiving a signal describing a vertical and horizontal position of the climber while the climber ascends the climbing wall. A method can include estimating a horizontal and/or or vertical attribute of a vertical and/or semi-vertical surface. A method can include maintaining a position of the UAV at: a distance normal to the plane data structure describing the climbing surface and relative to the horizontal and vertical position of the climber. A method can include recording the imagery of the climber as the climber ascends the climbing surface. And, the imagery can be associated with the point, vector, line, and/or plane data generated describing the attribute of the climbing surface.

The horizontal and vertical plane can describe, or estimate, the climbing surface. The vertical aspect of the vertical plane can be at substantially, or entirely, parallel to gravity at the location of the UAV. A horizontal line and gravity can also be used to define a normal vector to the UAV. Based on the normal vector to the UAV, a distance can be maintained and/or used as a control constraint. The normal vector can also be used to as a control constraint for UAV flight about the climbing surface (e.g. a "panning" flight program). A signal from the one or more distance sensors can include a description of at least three points on the climbing surface that define the horizontal and vertical plane describing the climbing surface. Sensor signals can also define two points on a line. Any points, lines, and/or planes can be averaged, extrapolated, weighted, and/or normalized. The line can be horizontal or vertical. The horizontal line can estimate a horizontal surface attribute of the climbing surface. The horizontal attribute defined by at least two points can be obtained using a LIDAR scanning system of the UAV. A SONAR sensor can also be used. The SONAR sensor can be used, for example, for initial detection of the vertical surface about a periphery of the UAV. Upon initial detection of the vertical surface, the orientation of the UAV can be corrected/obtained and directed to the proper orientation towards the vertical surface. Based on a detection of the angle of least distance an estimated normal vector can be obtained. For example, where a plurality of vertical and horizontal point are discovered from a UAV sensor, the most likely normal vector direction can be defined. Based on discovery of this normal vector the plane and/or horizontal and vertical lines can be defined using a gravity sensor, such as an accelerometer. Based on this discovery of a normal direction and/or distance towards the vertical surface, a height can be discovered. The height of the UAV can be received from one or more distance sensors and a preset, or predetermined height, of the UAV above ground level can be set so as to return to a predetermined autonomous steady state initial hovering position relative to the initial ground position of the UAV and the vertical surface within a certain range of the UAV.

After this initial state, the UAV can discover a transmitter or beacon attached to the climber according to various embodiments. Other position discovery techniques can include video recognition of the climber or other object suspended from the wall. Templates or pixel analysis can be used to recognize color, e.g. skin color, or a color of clothing worn. The clothing worn can also include a design, such as a worn encoder design. Various feature recognition templates can also be used to find a "best-fit" to a climber or features of the wall or suspended therefrom. Similarly, the wall can display a design, or encoded design, to identify the climber or a location of the climber. In the instance where the UAV is operating in fully autonomous state, the UAV may pilot itself from this initial state having a discovered distance along a normal vector to the vertical (or semi-vertical or complex) surface to an altitude and/or horizontal and/or vertical location corresponding to a height and location of the transmitter or beacon.

As the transmitter or beacon moves, e.g. in correspondence with the movement of a suspended climber, the position of the UAV is modified so as to retain a predetermined distance or relative position thereto. In some embodiments, the relative position based on distance of vector normal is determined by a video capture attribute. The video capture attribute can be associated with a physical attribute of the climber and/or the scenery or scenario of the vertical climbing environment.

A system can include the transmitter/beacon and the UAV. The transmitter and the UAV can communicate with one another so as to relay positional information of the beacon to and from the UAV. The beacon can also include a GPS, accelerometer or other sensor device so as to relay beacon information to the UAV or ground level.

In some embodiments, the capture of the climber in relation to other climbers or video graphic parameters is used to pilot the UAV. For example, the constraints of an indoor or outdoor climbing environment can be considered. In an outdoor climbing environment a panning piloting scenario may be used so as to capture the climber within the outdoor environment. In some previous UAV navigating a "looping", "circling," or "following" UAV piloting scenario may be inapplicable to the present invention due to the existence of the vertical surface and direction of vertical advancement of the climber. Accordingly certain embodiments include a "panning" piloting scenario is considered herein. The panning recording control parameters can be relative to the normal vector from the UAV to the point P of the vertical plane between the vertical surface or direction of gravity and the horizontal attributes of the climbing surface. For example, the UAV can be programmed or controlled to "pan" about the point P maintaining a certain distance therefrom while rotating about angles thereto.

The one or more distance sensors can include a light-based (e.g. laser light) distance measurement sensor. The one or more distance sensors include a sound-based distance measurement sensor. The signal describing the vertical and horizontal position of the climber while the climber ascends the climbing wall can describe the location of a vertical and horizontal transmitter worn by the climber. The signal describing the vertical and horizontal position of the climber while the climber ascends the climbing wall can include a recognized position of the climber from image analysis of the recorded imagery.

The distance normal to the plane describing the climbing surface can be modified based on a signal received by the UAV so as to record a larger portion of the climbing surface surrounding the climber. A second signal can be received describing a vertical and horizontal position, or point, of an additional climber while the climbers ascend the climbing wall. And, the UAV can be repositioned based on a different distance normal to the plane describing the climbing surface so as to capture both climbers. An equidistance attribute relative to the horizontal and vertical positions of both of the climbers can be determined such as a center point there between. A frame attribute of video capture can be modified, such as a border or boundary attribute, associated with the capture of two climbers as opposed to an initial capture attribute. Thus, the imagery of both of the climbers can be recorded as the climbers ascend the climbing surface.

A UAV for surveillance of a substantially vertical climbing surface can include a video camera and multiple rotary motors coupled to propellers for positioning the UAV at multiple different horizontal and vertical positions relative to the substantially vertical climbing surface.

A UAV can include one or more sensors for determining a vertical direction that is parallel to the direction of gravity at a location of the UAV. The gravity sensor can include an accelerometer. The vertical direction can also relate to a parallel substantially vertical direction of the climbing surface in some instances, or an approximation thereof.

The UAV can include one or more distance sensors for sensing at least three non-collinear surface points of the climbing surface. The UAV can sense at least two linear surface point of a first line describing the climbing surface and two (e.g. additional or one additional) points defining a line perpendicular to the first line.

The UAV can include computer software stored on a storage medium, such as ROM or RAM, for determining a substantially vertical plane of the climbing surface. The substantially vertical plane describing the climbing surface can also consider a vertical direction of gravity. The substantially vertical plane can include the at least three non-collinear points of the climbing surface. The substantially vertical plane can extend substantially parallel to the vertical direction of the climbing surface, or a portion or subset of surfaces, lines, and/or points of the climbing surface so as to provide a data representative model one or more surfaces of the climbing surface relative to the UAV for use in piloting the UAV relative thereto.

The computer software can recognize a horizontal direction of extension of the climbing surface that is perpendicular to the vertical direction of the climbing surface. The computer software can include instructions for determining a vertical position of a climber with respect to the climbing surface. The computer software can recognize a relative direction and distance to the climber and generate piloting instructions for the UAV so as to vertically and horizontally align the position of the UAV with a normal vector relative to the position of the climber and climbing surface.

The software can include executable instructions for repositioning the UAV at a distance normal to the substantially vertical plane of the climbing surface and relative to the horizontal and vertical position of the climber. Such means can include instructions and data structure settings for the UAV propulsion system for estimating an initial distance from the UAV to the climbing surface and initially stabilizing an initial airborne position of the UAV with respect to the climbing wall at a predetermined distance from ground and at the initial distance from the UAV to the climbing surface.

The UAV can include a video transmitter conFIG.d to receive and transmit live video imagery from the video camera. A video camera control system of the UAV can be conFIG.d to receive video camera control signals, the video camera control signals operating the video camera to capture a scene of the substantially vertical climbing surface based on a position of a graphical user interface worn by a person.

Some embodiments relate to a head-held or controlled input device. Some embodiments of such device can be lexograhically referred to herein as a belay virtual reality input device or belay goggles. A belay virtual reality device can include a UAV control input device based on one or more accelerometers. The one or more accelerometers an sense a movement, direction, or other attribute of the head of the belay and transmit a control signal to the UAV based on such movement attributes. The movement attributes can cause the transmission of corresponding signals to the UAV to pilot the UAV. The movement attributes of the belay virtual reality goggles can cause the transmission of the corresponding signals to the UAV which can control the camera on the UAV. Control of the camera can include a direction of video capture of the UAV that is independent of the piloting of the UAV. In such embodiments, the belay is allowed to send such control signals based on head movement while leaving the hands of the belay to perform manual tasks. The manual tasks of the belay can include management of a climbing rope. The manual tasks of the belay may be related to activities of the suspended climber. For example, where the climber encounters a particular problem or task, the belay may be able to be more aware, instruct, or assist the climber using head movements, verbal communication, redirection of UAV positioning, or other interaction between the belay and the climber or others involved with a certain task at hand.

The belay virtual reality goggles can also simply display the activity of the climber for the belay. The activity of the climber can be directly above the belay or in a remote location where the belay has difficulty viewing activity of the climber. The belay may also encounter uncomfortable viewing positions in addition to the difficulty of viewing perspective. Thus, the virtual reality "belay goggles" can offer various improvements to ground-based viewing due to the unique perspective of the UAV and its camera hovering at a relatively level position thereto according to certain embodiments of the disclosed invention.

The virtual reality goggles can include a display device conFIG.d to be worn by the operator's head and display video imagery of the climber captured by a drone as the climber ascends the vertical surface. The movement sensors for sensing movements of the operator's head can communicate with computing means for converting the movement of the operator's head into control signals. These control signal generating means can further include means for transmitting the control signals to the drone for controlling operation of the drone based on the movement of the operator's head in response to the video imagery displayed to the operator by the user interface worn by the operator. Other means for communication can be separate and distinct from one another as disclosed hereinafter.

The means for directing a video camera of a drone based on movements of the operator's head can display a climber suspended on a vertical surface to a belay operator. This drone, or components thereof, can include a plurality of motors and propellers for suspending the drone at different vertical and horizontal positions relative to the vertical surface and at normal distances to the vertical surface so as to capture video of the climber while the climber is suspended on the vertical surface. And, the user interface can be further conFIG.d to transmit commands based on head movements of the belay operator to the drone. In some embodiments, the display of the virtual reality goggles can be distinct from controls, or integrated thereby where the camera of the UAV reacts to the head movements but also receives certain piloting controls via various additional distinct movements and inputs of the person wearing the belay goggles. For example, the belay may use eye movement, blink, use facial muscles, or expressions which can be recognized by the belay goggles as further input to control the UAV.

BRIEF DESCRIPTION OF THE DRAWINGS

FIGS. 1-9 illustrate climbing safety pads, climbing walls, and arrangements of both pads and walls along with certain climbing accessories. Also illustrated by FIGS. 1-9 are customizations of designs and manufacturing methods illustrated therein and explained in the following detailed description.

FIGS. 10A and 10B illustrate scenarios, methods, and apparatus;

FIGS. 12A-12E illustrate scenarios, methods, and apparatus showing additional example features thereof;

FIGS. 13A-13D illustrate accessories, methods, and components;

FIG. 13C also illustrates belay goggles showing additional example features thereof.

DESCRIPTION OF EXAMPLE EMBODIMENTS ILLUSTRATING THE INVENTION

Figure 11A:
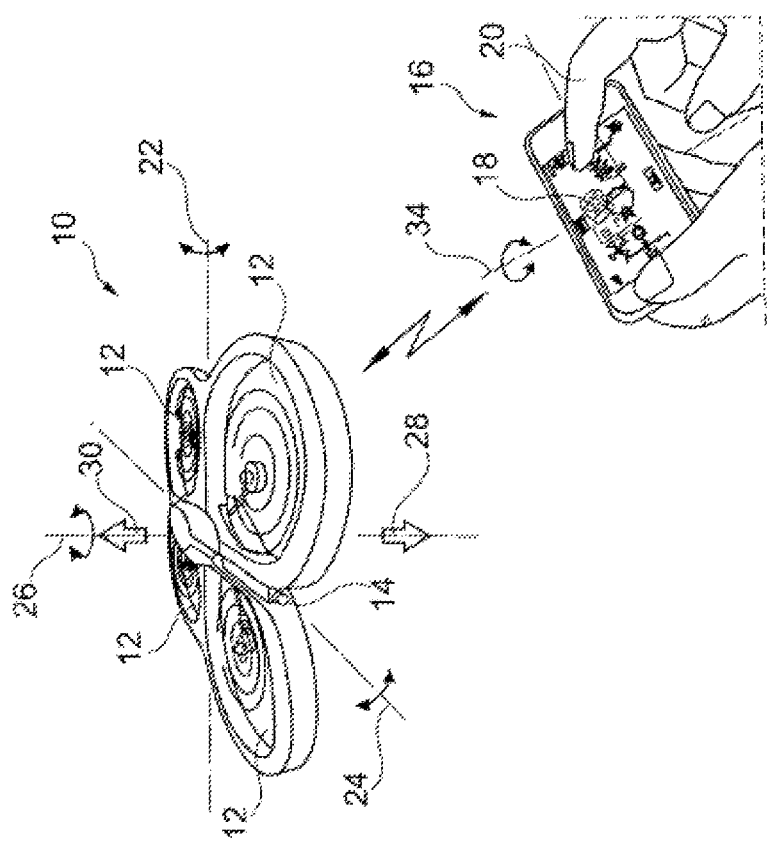
FIGS. 11A and 11B illustrate accessories, methods, and components.

As disclosed herein, a climbing surface can refer to a vertical or semi-vertical climbing surface. A climbing surface can include a rock climbing surface, a bouldering surface, a rock climbing wall, an artificial climbing wall, and/or a bouldering wall whether indoor or outdoor. Several of the following embodiments of the invention relate to the variable design of a safety pad dependent on the attributes of a climbing surface. In some embodiments, the design of the safety pad can vary across a length, width, and/or thickness depending on an anticipated height from which a climber is likely to fall to a particular fall location of the safety pad from the climbing surface. Moreover, the safety pad can further vary with construction, deformable property, and/or material composition across a length, width, and/or thickness of the safety pad depending on the height from which a climber is likely to fall from a climbing surface. Other climber attributes, falling attribute, climbing wall attribute, and/or safety pad properties and attributes can also be considered in the design of a safety pad and/or climbing wall as discussed hereinafter.

Thus, the design of the safety pad can be dictated by the design of the climbing wall, or vice versa. And, the design of a particular location of a climbing wall can be associated with a particular fall location (or "fall zone") of a safety pad being directly thereunder. Similarly, where the climbing wall is a naturally occurring climbing surface, the safety pad can be defined by the positions from which a climber will fall from the naturally occurring climbing surface.

Several of the following described embodiments of the invention relate to a safety pad for use with rock climbing, bouldering, or falling where a fall characteristic can be anticipated and the pad is designed based on such fall characteristic. For example: more currently, rock climbing and bouldering walls are made as opposed to being naturally occurring. In such instances, manufactured rock climbing and bouldering walls are specifically designed with predetermined routes for climbers of an intended skill level. And, often, climbing such walls can result in a climber falling from such walls at various locations of the climbing walls.

Often, the designed and made walls include specifically chosen geometries, holds, volumes, and (linear and non-linear) angles of inclination resulting in multiple routes of relative difficulty. This design of chosen geometries, holds, volumes, inclines and difficulty of routes effect (often intentionally) the difficulty of the climb, and thereby, the likelihood of a fall at particular locations of the climbing wall.

One recognition of several embodiments disclosed herein is that a climber tends to fall vertically from a wall. Thus, according to the teachings herein, a location of a fall can be anticipated. And, a fall characteristic of a fall at that location can likewise be understood and a safety pad can be designed according to this prediction. Moreover, in addition to a predetermined prediction, a fall characteristic can also be actively monitored (e.g. by impact, force, and strain sensors), analyzed, and the safety pad can be continuously modified, updated, optimized, or actively replaced. Thus, the safety pad can have embedded or overlaid, or overlaying sensors at predetermined positions across the length and width of the safety pad. Such sensor locations can be defined by a center point (or other determined location) of an impact zone of the safety pad and the location can be an equidistant grid of sensor pad locations across a length and width of the safety pad. Thus, the matrix of impact sensors can be disposed in a matrix over, under, or within the zones of the impact of the safety pad with interconnected electronic connections there between. The sensors of each individual impact zone may also be individually addressed and individually access according to an active grid, such as that used to access an individual pixels of an image display, but on a much larger scale appropriate for the size of the safety pad. Thus, a two dimensional grid of sensors spanning the length and width of the impact zones is used according to some embodiments. Moreover, as such, a pad characteristic (such as wear, anticipated or changed use, change in resiliency, or other pad characteristic) that changes over-time can likewise be monitored for compliance with a safety design, calibration, or wear, application, or use requirement.

Thus, according to several embodiments disclosed herein, a safety pad to which a climber falls can be designed based on a particular location from which the climber falls. The particular location may be defined by a climbing wall location above which a fall zone of the safety pad exists. As such, portions of the safety pad at different fall zone(s) (or location(s)) to which the climber falls) can be selected based on the design of the climbing wall. Moreover, fall characteristics at each two dimensional fall zone of a safety pad can be sensed and monitored to optimize the safety of a falling climber over-time or post-manufacture or post-installation of the safety pad. And, as a climbing wall is modified, the corresponding fall zones of a safety pad can likewise be updated to correspond to the design change of a corresponding climbing wall.

Moreover, a safety pad characteristic can be dependent on a climber attribute to which a fall zone of the safety pad is designed. For example, a weight (e.g. lbs.) height (how tall), or skill (e.g. experience related to climbing and/or falling) can be considered for a corresponding intended fall zone(s).

To illustrate, referring to FIG. 1 a climbing wall 100 is shown. The climbing wall 100 is entirely vertical and parallel to a vertical Z-direction. This vertical Z-direction also defines a thickness T of a safety pad 110. The Z-direction is parallel to the force of gravity (g) of the Earth (i.e. straight down). The safety pad 110 extends a length L in the X-direction which also extends a width W (not shown) in the Y-direction. The X-, Y-, and Z-directions are all three perpendicular to one another. And, it follows that, the length L in the X-direction and the width W in the Y-direction are perpendicular to the vertical Z-direction parallel along which climbers fall.

The height H of the climbing wall 100 is defined as the distance between a ground level 130 of the climbing wall that meets the safety pad. This ground level is a position from which a climber begins climbing the climbing wall 100. The ground level 130 of the climbing wall can also be referred to as the "base" of the climbing wall 100 where the climbing wall 100 meets the safety pad 120. And, while not shown, this first example assumes a constant cross-sectional profile in the width W of the rock climbing wall 100 and the width W of the safety pad 110 in the Y-axis direction (into the illustration of FIG. 1). All though not shown in FIG. 1, however, the length and width of the safety pad need not always be perpendicular to the force of gravity in the Z-direction. Rather, the safety pad (or portions thereof) may be at an angle to the Z-direction to thereby further reduce the distance from which a climber falls off the climbing wall 100 to the safety pad 110.

The climbing wall 100 has a plurality of holds 120A-D. The holds are of any form and include a protrusion and/or indentation. As illustrated in FIG. 1, the holds 120A-D are disposed directly above one another and along the height H of the entirely vertical climbing wall 100. Thus, a climber's fall from any of the holds 120A-D of the entirely vertical climbing wall 100 will impact the safety pad 110 at substantially the same fall zone 140. This location of impact 140 of a safety pad 100 is referred to herein as an impact zone 140 or fall location 140. However, an impact characteristic of a fall from the holds 120A-D will be different based on a height H from which the fall began. In addition, an impact characteristic (e.g. magnitude of force) from the holds 120A-D varies due to a weight characteristic of a climber falling from each hold 120A-D. And, the safety pad's 110 characteristic in the impact zone 140 can vary due to both the weight of the climber and height H from which the climber fell.

Regarding the physics related to a climber's fall:

In 1687, English mathematician Sir Isaac Newton published Principia, which hypothesizes the inverse-square law of universal gravitation. In his own words, "I deduced that the forces which keep the planets in their orbs must [be] reciprocally as the squares of their distances from the centers about which they revolve: and thereby compared the force requisite to keep the Moon in her Orb with the force of gravity at the surface of the Earth; and found them answer pretty nearly."

This observation means that the force of gravity on an object at the Earth's surface is directly proportional to the object's mass. Thus an object that has a mass of m will experience a force:

$$\vec{F}=m\vec{g}$$

Where F is the force, m is the mass and g is the gravitational constant. In free-fall, this force is unopposed and therefore the net force on the object is its weight. For objects not in free-fall, the force of gravity is opposed by the reactions of their supports. For example, a person standing on the ground experiences zero net force, since his weight is balanced by a normal force exerted by the ground. The strength of the gravitational field is numerically equal to the acceleration of objects under its influence. The rate of acceleration of falling objects near the Earth's surface varies very slightly depending on elevation, latitude, and other factors (such as the friction of air, which is negligible in regard to this invention). Other analysis can be conducted regarding potential and kinetic energy which are well known.

For purposes of weights and measures, a standard gravity value is:

$$g=9.80665 m/s2(32.1740 ft/s2).$$

Assuming the standardized value for g and ignoring air resistance, this means that climber falling freely near the Earth's surface (e.g. from 10-40 feet) increases its velocity by 9.80665 m/s (32.1740 ft/s or 22 mph) for each second of its descent. Thus, a falling climber starting from rest (also assuming that the climber does not "push-off" of the climbing wall) will attain a velocity of 9.80665 m/s (32.1740 ft/s) after one second, approximately 19.62 m/s (64.4 ft/s) after two seconds, and so on, adding 9.80665 m/s (32.1740 ft/s) to each resulting velocity. This falling velocity can also be easily calculated from a given vertical distance. And, again ignoring air resistance, any and all falling climbers, when falling from the same height, will hit the safety pad at the same time. However, the force of impact (deceleration of the falling body form the falling velocity to rest) will also concern the falling climber's weight.

A modern statement of Newton's Second Law is a vector equation:

$$\vec{F} = \frac{d\vec{p}}{dt},$$

where p is the momentum of the system, and F is the net (vector sum) force. In equilibrium, there is zero net force by definition, but (balanced) forces may be present nevertheless. In contrast, the second law states an unbalanced force acting on an object will result in the object's momentum changing over time.

By the definition of momentum, $$\vec{F} = \frac{d\vec{p}}{dt} = \frac{d(m\vec{v})}{dt},$$

where m is the mass and v is the velocity.

Newton's second law applies only to a system of constant mass, and hence m may be moved outside the derivative operator. The equation then becomes $$\vec{F} = m\frac{d\vec{v}}{dt}.$$

By substituting the definition of acceleration, the algebraic version of Newton's Second Law is derived:

$$\vec{F}=m\vec{a}.$$

Newton never explicitly stated the formula in the reduced form above.

However, it is important to note that the impact of a falling climber with a safety pad is not a static analysis, but rather, a dynamic deceleration of the moving climber in an impact with the safety pad. In mechanics, an impact is a high force or shock applied over a short time period when two or more bodies collide. Such a force or acceleration usually has a greater effect than a lower force applied over a proportionally longer period. The effect depends critically on the relative velocity of the bodies to one another. In this instance, the ground is stationary and the falling climber has a velocity at impact.

At normal speeds, during a perfectly inelastic collision, an object struck by a projectile will deform, and this deformation will absorb most or all of the force of the collision. Viewed from a conservation of energy perspective, the kinetic energy of the projectile is changed into heat and sound energy, as a result of the deformations and vibrations induced in the struck object. However, these deformations and vibrations cannot occur instantaneously. A high-velocity collision (an impact) does not provide sufficient time for these deformations and vibrations to occur. Thus, the struck material behaves as if it were more brittle than it would otherwise be, and the majority of the applied force goes into fracturing the material. Or, another way to look at it is that materials actually are more brittle on short time scales than on long time scales: this is related to time-temperature superposition. Impact resistance decreases with an increase in the modulus of elasticity, which means that stiffer materials will have less impact resistance. Resilient materials will have better impact resistance.

In further addition to the immediate discussion related to force, acceleration, velocity, and impact: a frequency of fall and wear characteristic can further depend on a level of difficulty determined by the wall design, hold or route location characteristic, and skill of the climber in addition to the magnitude of fall impact at the impact zone of the safety pad based on a height of the fall and weight of the climber. Thus, the safety pad design and attributes of the climbing wall can together, or individually in-view of the other, be designed to optimize the safety and wear of the safety pad, as well as the enjoyment, excitement and continued safety of the intended climber(s). Moreover, discrete safety pad locations can be selectively replaced or added-to to optimize the safety and/or wear characteristics of the safety pad at one or more impact location zones of the safety pad.

To further illustrate, FIG. 2 shows a climbing wall 200 with a plurality of holds 220A-D disposed at an angle to a safety pad 210. In this embodiment, the climbing wall 200 is not perpendicular to the safety pad 210. The climbing wall 200 is also not parallel with the Z-direction, rather is at an angle to both the Z-direction and the X-direction. Similar to FIG. 1, the holds 220A-D of the climbing wall 200 in FIG.

2 are disposed above the safety pad 210 at different heights h1-4 above the safety pad 210. However, due to the relative angle of the climbing surface 205 of the climbing wall 200 to the safety pad 210, the holds 220A-C are disposed above different fall zones 240 A-D of the safety pad 210 along the length L of the safety pad 210. And, as such, each fall zone 240A-D of the safety pad 210 will experience a different fall characteristic due to the corresponding height h1-4 from which a climber falls. That is, for example, a first fall zone 240A of the safety pad 210 is associated with a first hold 220A being at a first distance h1 from the first fall zone 240A. As a result, the first fall impact zone 240A of the safety pad 210 is associated with a first impact characteristic. The first impact characteristic of the first fall zone 240A is different than a second impact characteristic of a second fall zone 240B of the safety pad 210 related to a corresponding second hold 220B at a second distance h2 from the second fall zone 240B. A similar analysis is associated with the third 220C, fourth 220D, and . . . additional (not shown) holds 220 and . . . additional impact zones 240.

Moreover, as discussed above, a difficulty defined by the first hold 220A can be different than a difficulty defined by the second hold 220B. For example, first hold 220A may be associated with a static climbing move and second hold 220B may be associated with a higher-skilled dynamic climbing move. Thus, a frequency of impact at the first impact zone 240A can be different (i.e. higher, or lower) than the second impact zone 250B, or vice versa, and so on for the third, fourth, and next hold. Thus, the frequency of impact at the first impact zone 240A and the second impact zone 250B can be proportional to a difficulty associated with hold 220A and 220B respectively. And, this impact characteristic (such as frequency of impact, magnitude of impact, or likelihood of impact) can also be attributed to the corresponding impact zone(s) 240 of the safety pad 240 associated with (directly beneath) associated holds 220 of the climbing wall 200. The width of an impact zone can be determined based a margin of prediction of the accuracy to which the climber falls to a particular location. Thus, the width of an impact zone can be a matter of inches, feet, or yards in length and width in the X- and Y-directions. And, regressions and interpolations between estimated impact locations, impact force applied to, and material properties of impact zones 240, from impact zone 240 to an adjacent impact zone 240, and within an impact zone 240, can likewise be made.

Moreover, as discussed with reference to any of the embodiments disclosed herein, the skill level of a climber associated with a hold or an impact zone of the safety pad can be considered. For example, where the hold is attributed to a high skill level, a fall characteristic of the impact zone of the safety pad can be considered. Where a high skill level climber is more likely to know how to fall according to correct technique, this high skill level can be considered when designing the safety pad at the corresponding impact location of the safety pad. As such, according to some examples, the impact zone of the safety pad associated with a high skill level climber may be less deformable and/or more wear resistant than in an impact zone associated with low level climbers. An impact zone associated with a similarly high skill level climber can also consider an impact from a higher fall height above the safety pad and, as a result, a corresponding larger impact and wear property from a higher impact characteristic associated with a higher skill level climber.

For another example, where the hold is attributed to a relatively low skill level climber, the impact zone corresponding the hold can consider a more frequent low skill level fall from a low skill level climber. And, the impact zone corresponding to the same hold can also consider an impact characteristic associated with a less experienced and less technically correct fall within the safety pad zone. So, a cushioning, deforming, and wear characteristic of the safety pad in the impact zone corresponding to a less experienced can be more "forgiving" or designed for a more frequent impact from less experienced climbers.

In addition to, or separate from, the height of a hold and skill level of a climber discussed above, the design and construction of a safety pad can consider a weight of an associated climber above a particular impact zone of the safety pad. For example, a body type of an associated climber can be considered when designing a safety pad or impact zone(s) characteristics of a safety pad. Where the climber to which the climbing wall is designed is a relatively old, young, heavy, light, tall, short, etc., and somewhere in-between, the associated safety pad (or safety pad zone(s)) can take into account this difference in body type to enhance climbing enjoyment and/or safety. For example, a safety pad, or safety pad zone(s), can be designed for a relatively short and low-weight child with low skill level of climbing ability and a low level of falling skills.

Thus, a safety pad, or one or more zone(s) of a safety pad, associated with a level 5 skill level (SL) climber having a level 5 weight (LBs), falling from a level 5 height (H), with a level 5 frequency (F), from a level 5 difficulty level (DL) hold will be designed differently than a level 1 skill level (SL) climber having a level 1 weight (LBs), falling from a level 1 height (H), with a level 1 frequency (F), from a level 1 difficulty level (DL) hold.

In addition to an even consideration of such impact attributes associated with a safety pad (or one or more safety pad zone(s)), these impact attributes can be individually weighted according to a predetermined, or optimized over time, algorithm. For example, a weighted algorithm can assign a relative weight to SL, LBs, H, F, DL, and DL in designing the safety pad, or safety pad zone(s). And, even, a desired safety level can be considered to maximize enjoyment by a relevant climber. For example, it might be more important to a child (or inexperienced climber) being introduced to rock climbing to enjoy a more pleasant (if possible) fall from a climbing wall than a more skilled adult climber.

Referring now to FIGS. 3 and 4, different geometries of climbing walls 300 400 with different locations of holds 320 420 are illustrated. The climbing wall 300 can include different inclinations that may be linear or non-linear as shown in FIG. 3. The climbing wall 400 can include different volumes 450A-C attached to the climbing wall 400 further complicating the climbing wall's geometry and location of holds 420A-G thereon. The hold 320 420 in each climbing wall 300 400 design can define different impact zones 340 440 of a corresponding safety pad 310 410. And, each of the impact zones 340 440 can consider impact characteristics associated thereto by holds 320 420 and other challenged directly above.

Moreover, the geometry of a climbing wall can vary across a width W (direction Y) of the climbing wall. For example, a climbing wall may include a first cross-sectional geometry according to FIG. 1, a second cross-sectional geometry according to FIG. 2, a third cross-sectional geometry according to FIG. 3, a fourth cross-sectional geometry according to FIG. 4, and so forth. The different sections of a climbing wall can have different geometries and can be adjacent to one another with a predetermined distance there between. The transition from the geometry of one section of a climbing wall to a second section of the climbing wall can be smooth, interpolated abrupt, semi-abrupt, linear, non-linear, or a combination thereof along a width and height of the climbing wall. These different geometries can be estimated by virtual planes, points, lines, and other vector data as scanned or otherwise recognized. Three dimensional models, control algorithms of videographic devices and systems can be associated with these models and data structures. And, such data structures can be used in conjunction with software that can be originally written or updated accordingly as disclosed herein.

And, as discussed above, the attributes of the different impact zones of the safety pad can be determined based upon the particular region (e.g. holds and location) of the climbing wall directly there above. And, the attributes of each impact zone of the safety pad can consider other attributes of the associated climber thereto as further discussed above.

Thus, as a result of that discussed above and illustrated in the FIGS., an attribute of the safety pad can be varied across a width, length, and/or thickness of the climbing pad. For example, the properties of the safety pad can be varied across the width, length, and/or thickness of the climbing pad due to an impact attribute (anticipated, experienced, or sensor measured impact attribute) at that location of the safety pad. For example, a deformation property of the climbing pad can be varied across a width, length, and or thickness of the climbing pad. A wear property can be varied across a width, length, and/or thickness of the climbing pad. A safety pad property at a particular impact location of the safety pad can be varied or changed by a change in design of the association location of the climbing wall. And, the portion of the safety pad at a particular impact location can be changed, replaced, or improved as an impact property of the safety pad changes, ages, or deteriorates over time.

Referring to FIGS. 5-7, examples of safety pad 510 610 710 property profiles 560 660 760 are illustrated. The safety pads 510 610 710 can be designed and manufactured to include a plurality of impact zones with different impact properties as discussed above with reference to FIGS. 1-4. The impact properties can be defined by the materials used within the safety pad at various impact locations. A shown in FIG. 5, for example, the materials 510A and 510B of the safety pad 510 used can include a top layer material 510A and a bottom layer material 510B. The layers of the safety pad 510 can include the top layer with a relatively different deformability property to the bottom layer. And, any number of layers may be used as opposed to simply a top and bottom layer. The safety pad can include a casing layer to which an impact is made and the casing layer can distribute the impact to the top layer which in-turn distributes the impact to the bottom layer (or subsequent layer there between).

Thus, the top layer material 510A may be a relatively more deformable layer made of a relatively more deformable material than the bottom layer material 510B. Or, the top layer may be substantially less deformable than the bottom layer but more widely distribute an impact over a larger portion of the more deformable bottom layer, or layers there between.

The top layer may be relatively more elastic than the bottom layer, or layers there between. The top layer may be made of a "crash" material—a material that plastically deforms in the presence of a large impact. Or, the bottom layer may be a plastically deformable material in the instance that the "cushioning" of the relatively elastic top material is insufficient to absorb a large impact.

The top and/or bottom layers can further include a "fracturing" component according to a stress-strain curve. This curve can show a relationship between stress (force applied) and strain (deformation) of a safety pad material. And, the material properties of a safety pad can vary along a length, width, and/or thickness of the safety pad. The variation of material properties from an impact zone(s) to another impact zone (s) can vary. The variation in material properties can vary abruptly, linearly, and/or non-linearly from zone(s) to zone(s) and/or within a zone. And, the zone(s) may not be distinctly defined where impact zone(s) can vary in size and shape across a length width and/or thickness of a safety pad.

Regarding safety pad materials, as discussed above, the material(s) can vary themselves in mechanical properties in addition to size, location, and thickness of one or more layers.

Elastic deformation (elasticity) is reversible. Once the forces are no longer applied, the object returns to its original shape. Elastomers exhibit large elastic deformation ranges, as does rubber. However elasticity is nonlinear in these materials. Whereas plastic deformation is irreversible. However, an object in the plastic deformation range will first have undergone elastic deformation, which is reversible, so the object will return part way to its original shape. Soft thermoplastics have a rather large plastic deformation range. Hard thermosetting plastics, rubber, crystals, and ceramics have minimal plastic deformation ranges. One material with a large plastic deformation range is wet chewing gum, which can be stretched dozens of times its original length. And, rubber elasticity, a well-known example of hyperelasticity, describes the mechanical behavior of many polymers, especially those with cross-links.

The bulk properties of a polymer are the properties that dictate how the polymer actually behaves on a macroscopic scale. The tensile strength of a material quantifies how much elongating stress the material will endure before failure. This is very important in applications that rely upon a polymer's physical strength or durability (e.g. wear properties). For example, a rubber band with a higher tensile strength will hold a greater weight before snapping. In general, tensile strength increases with polymer chain length and crosslinking of polymer chains.

Young's Modulus quantifies the elasticity of the polymer. It is defined, for small strains, as the ratio of rate of change of stress to strain Like tensile strength, this is highly relevant in polymer applications involving the physical properties of polymers, such as rubber bands and damping/cushioning properties related to an impact. The modulus is strongly dependent on temperature. Viscoelasticity describes a complex time-dependent elastic response, which will exhibit hysteresis in the stress-strain curve when the load is removed. Dynamic mechanical analysis or DMA measures this complex modulus by oscillating the load and measuring the resulting strain as a function of time.

Hysteresis is the time-based dependence of a system's output on current and past inputs (e.g. wear over-time). The dependence arises because the history affects the value of an internal state. To predict its future outputs, either its internal state or its history must be known. If a given input alternately increases and decreases, a typical mark of hysteresis is that the output forms a loop as in the figure. In the elastic hysteresis of rubber, the area in the center of a hysteresis loop is the energy dissipated due to material internal friction.

A simple way to understand it is in terms of a rubber band with weights attached to it. If the top of a rubber band is hung on a hook and small weights are attached to the bottom of the band one at a time, it will get longer. As more weights are loaded onto it, the band will continue to extend because the force the weights are exerting on the band is increasing.

When each weight is taken off, or unloaded, the band will get shorter as the force is reduced. As the weights are taken off, each weight that produced a specific length as it was loaded onto the band now produces a slightly longer length as it is unloaded. This is because the band does not obey Hooke's law perfectly. The hysteresis loop of an idealized rubber band is shown in the figures.

In terms of force, the rubber band was harder to stretch when it was being loaded than when it was being unloaded. This is also relevant to compression of a safety pad material. In terms of time, when the safety pad is unloaded, the cause (the force of the weight thereupon) lagged behind the effect (the thickness) because a smaller value of weight produced the same length. In terms of energy, more was required during the loading than the unloading, the excess energy being dissipated as heat.

Elastic hysteresis is more pronounced when the loading and unloading is done quickly (e.g. in an impact from falling) than when it is done slowly (e.g. due to walking on it). Materials such as rubber exhibit a high degree of elastic hysteresis.

When the intrinsic hysteresis of rubber is being measured, the material can be considered to behave like a gas. When a rubber band is stretched it heats up, and if it is suddenly released, it cools down perceptibly. These effects correspond to a large hysteresis from the thermal exchange with the environment and a smaller hysteresis due to internal friction within the rubber. This proper, intrinsic hysteresis can be measured only if the rubber band is adiabatically isolated.

For example, small vehicle suspensions using rubber (or other elastomers) can achieve the dual function of springing and damping because rubber, unlike metal springs, has pronounced hysteresis and does not return all the absorbed compression energy on the rebound. Mountain bikes have made use of elastomer suspension, as did the original Mini car.

And, rubber material cushioning materials in a safety pad are only one example of the many types of cushioning materials (or a combination thereof) used and disclosed herein for understanding of the underlying teachings related to the disclosed embodiments.

Additional cushioning materials can include:

Loose fill—Some cushion products are flowable and are packed loosely. One example of a loose fill cushion is a "bean bag chair." The safety pad, or a portion/layer thereof, can be filled and then closed to tighten the pad at a particular section or location thereof. This includes expanded polystyrene foam pieces (foam peanuts), plastic or rubber bb's, similar pieces made of starch-based foams, and common popcorn for example. The amount of loose fill material required and the transmitted shock levels vary with the specific type of material. And, the fill may also be impregnated within a setting polymer to take a desired form.

Cellulose or paper—Paper can be manually or mechanically wadded up and used as a cushioning material in a safety pad. Heavier grades of paper provide more weight-bearing ability than old newspapers. Creped cellulose wadding is also available.

Corrugated fiberboard pads—multi-layer or cut-and-folded shapes of corrugated board-type material can be used as cushion material in a safety pad. These structures are designed to crush and deform under shock stress and provide some degree of cushioning. Paperboard composite honey-comb structures are also used for cushioning in some embodiments disclosed herein.

Foam structures—several types of polymeric foams are used for cushioning in the embodiments disclosed herein. The most common are: expanded Polystyrene (also Styrofoam), polypropylene, polyethylene, and polyurethane. These can be molded engineered shapes or sheets which are cut and glued into cushion structures of safety pads. Some degradable foams are also available.

Foam-in-place is another method of using polyurethane foams. These fill the safety pad, or pad layer and can also be used to form engineered structures.

Molded pulp—pulp can be molded into shapes suitable for cushioning.

Inflated products—One example of an inflatable cushion is an automobile air-bag. Another example is an inflated balloon, inflated bounce house, or inflatable blatter to which a stunt person falls upon. Bubble wrap, for example, consists of sheets of plastic film with enclosed "bubbles" of air. These sheets can be layered as well and air communication between air-filled chambers can create a controlled distribution of air from one chamber to another in case of a large fall impact. In addition a designed pressure release valve or engineered release air exhaust opening can further be included to increase the cushioning effect. And, replacement of the "blown-open" quick-release air exhaust door can be done along with pumping air back into the inflatable chamber. A variety of engineered inflatable air cushions are also available.

Several other types of cushioning are available including suspension cushions and shock mounts underlying the safety pad or portions thereof.

Thus, any form of cushioning or a combination of cushioning materials can be used in a safety pad as disclosed herein. In fact, a safety pad may be referred to as a fall cushion. Cushioning is used to help protect fragile items, such as the human body, such as during a fall impact in the disclosed embodiments. A fall also produces potentially damaging shocks to the human body. Thus, cushioning pads help prevent, or reduce, injury due to a fall impact.

Thus, referring again to FIGS. 5-7, a variation of such properties can be designed in a safety pad. And, these material properties can be varied across the width, length, and thickness of the safety pad as well as from impact zone to impact zone (or group of impact zones to group of impact zones) or within an impact zone itself as shown by the safety pad 510 610 710 property profiles 570, 670A, 670B, 670C, and 770.

For example, referring to FIG. 5, a climbing wall 500 and safety pad 510 similar to that of FIG. 1 is shown. In this example, a property profile 570 of the safety pad 510 is illustrated across a length L in direction X of the safety pad. As shown, the material property of the safety pad 510 according to the property profile 570 is substantially consistent for a first portion 570A of the safety pad's 510 length L, then is linearly reduced along a second portion 570B to a lower level of the property of the safety pad, then is held constant at that lower level of the safety pad for a length 570C further away from the climbing wall 500. Thus, the first section 570 can be most proximate (or immediately adjacent) to the climbing wall 500, the second section 580 can be less proximate (or more remote, and further away) to the climbing wall 500 and the third section 570C can be less proximate (and more remote, and further away) to the climbing wall 500. This property profile 570 can be a modulus of elasticity and/or wear property of the safety pad as the distance from the wall is increased. And, this difference of safety pad 510 property is also different depending on impact properties, such as impact likelihood and impact magnitude association with the location of the portion 570A-C of the safety pad 510.

FIG. 6 illustrates a climbing wall 600 and safety pad 610 similar to that of FIG. 2. In this example three property profiles (profiles 610A, 610BB, and 610C) of different safety pads 610 (or different impact locations of a safety pad 610) are illustrated. As shown, the property profile 670A-C of the safety pad 610A-C can be constant, increase or decrease linearly, increase or decrease abruptly, and/or increase or decrease non-linearly across a length, width or thickness of the safety pad. The change in property profile 670A-C and be based in hold 620A-D attributes as discussed herein.

Similarly, FIG. 7 illustrates a climbing wall 700 similar to that of FIG. 4 that includes various volumes 780A-C that may be associated with various difficulties related to skill level, height, age, climber attributes, etc. As such, the material properties of the safety pad 710 can likewise vary accordingly between (and within) various impact zones (not shown) of various dimensions of the safety pad 710. And, the material property profile of the safety pad 710 can be varied according to various configurations and layers.

The construction of a complicated safety pad, such as safety pad 710 can be created using a large 3-D material disposition apparatus, such as a large 3-D printing head extruding a cushioning material upon safety pad support substrate. Distinct impact zone quadrants can be created and interlocked together by interlocking features of the underlying support substrate. Thus, a safety pad zone can be considered a square, rectangular, or triangular quadrant part of a larger safety pad that can be in individually made, interlocked together, and individually replaced as needed, desired, optimized, or in response to a rock climbing surface redesign. Similar constructions may be used to make desired climbing walls as disclosed herein as well as the climbing features such as holds and volumes. And, these holds and volumes may also be constructed so as to be inter-lockable and replaceable or customizable as well.

According to embodiments disclosed herein, a climbing and/or bouldering wall can include more than one portion with a fall-reset flooring disposed there between. For example, referring to FIG. 8, climbing walls 800A1, A2, B1, and B2 with multiple safety pads 810A1, A2, B1, and B2 are illustrated. This embodiment is particular desirable in a multi-teared bouldering wall environment which may be adjacent to top-roped climbing walls in a common climbing gym. In this example, a climber is allowed to climb a first climbing wall 800A1 that may be without the aid of a climbing rope—e.g. a first bouldering wall 800A1. While climbing the first climbing wall 800A1, the climber is protected by a first safety pad 810A1. And, a predetermined safe height of the first climbing wall 800A1 is retained. The first, and subsequent, safety pads 810 can have any configuration disclosed herein.

After climbing the first climbing wall 800A1, the climber climbs onto a second safety mat 810A2 using a ladder 880A, for example. The climber walks across the second safety mat 810A2 and begins climbing the second climbing wall 800A2 also limited to a safe second height above the second safety pad 810A2. The second climbing wall 800A2 can be of increased angle relative to the Z-vertical direction as opposed to the first climbing wall 800A1 such that a fall from the second climbing wall 800A2 to the second safety pad 810A1 will not result in a fall beyond the edge of the second safety pad 810A2. Additional measures, such as a net 880B, can also be included to further prevent a fall from the second safety pad 810A2 to the first safety pad 810A1. And, upon successfully climbing to the top of the second climbing wall 800A2 (or an additional subsequent climbing wall) a climber can be allowed to descend (e.g. by a repelling rope 890A) back to the base floor of the climbing gym to begin climbing again. In this way, the climber is not required to climb back down the climbing walls 800A1 and 800A2 and subsequent climbers may begin climbing without waiting for the previous climber to climb down the climbing wall(s). And, in-fact, a climber's enjoyment of climbing may be increased with a lack of the need to climb back down a bouldering climbing wall. And, an increased number of climbing routes can be vertically added without the need of laterally introducing new climbing obstacles.

In addition, according to such embodiments, a vertical utilization of climbing gym space is used. For example, in an indoor climbing gym, a rock climbing wall used for rope-secured climbing may be 40+ feet high. However, a bouldering wall may only be 15-20 feet high, or sometimes less. Thus, with a multi-tiered bouldering wall design as illustrated in FIG. 8, this vertical-space of an indoor climbing gym can be more fully utilized by serially and vertically scalable boulder walls as shown in FIG. 8. A similarly tiered dual vertically disposed climbing walls 800B1 and 800 B2 and corresponding similarly tiered dual vertically disposed climbing walls 810B1 and 810B2 maybe included where a climber may be allowed to transition from climbing wall 800A1 to climbing wall 800B2; and from climbing wall 800B1 to climbing wall 800A2, if desired to add additional variety to the experience. And, adjacent climbing routes may be disposed across a width of climbing walls 800A1, A2, B1, and B2 as previously discussed. Thus, any of the teachings herein can be variously combined as disclosed herein.

Regarding climbers who enjoy the thrill of a more "free" climbing experience, such climbers will find additional excitement and relative safety according to many of the embodiments disclosed herein. That is—free solo climbing, also known as free soloing, is a form of free climbing where the climber (the free soloist) goes alone and does not use ropes, harnesses and other protective gear while ascending, relying only on his or her climbing ability. Unlike in bouldering, climbers go beyond safe heights and a fall always means serious injury or death. Free solo climbing should not be confused with normal free climbing, in which gear is used for safety in case of a fall, but not to assist the climb. Thus, free solo climbing is generally not used in commercial indoor climbing gyms. However, one may well be able to increase the relative safety of experienced bouldering, or free soloing, to a certain extent using various teachings as disclosed herein.

Various embodiments disclosed herein can also benefit a social aspect of climbing as consideration of a climbing wall and/or a safety pad are designed. For example, a climbing experience can be enhanced where climbers of different attributes are considered with regards to enjoying the sport of climbing together. In an embodiment of such example, a first climber having first attributes may enjoy climbing adjacent to a second climber having second attributes. The first climber may be a relatively higher skill level than the second climber. The first climber may be relatively older than the second climber (e.g. the first climber may be a parent of the second climber; or, the first climber may be a relatively more experienced friend of the second climber). The first climber may be relatively heavier than the second climber. The first climber may be relatively taller than the second climber. The first climber may fall more frequently than the second climber, enjoy a more difficult climbing experience than the second climber, and/or be more skilled at falling than the second climber, and so forth.

Referring to FIG. 9, according to the teachings disclosed herein, a first route A of a climbing wall 900 can include a first set of holds (not shown) designed for the first climber; and a second route B of the same climbing wall includes a second set of holds (not shown) designed for the second climber. However, the first and second routes A and B can be intentionally located adjacent to one another (as opposed to separate areas of a climbing gym) as shown such that the first and second climbers can individually enjoy their own particular climbing experience along their own climbing route while also enjoying this experience in a relatively close climbing vicinity. The climbing route A and holds (not shown) associated with the first climber can be color identifiable from the route B and holds (not shown) associated with the second climber. And, as discussed above, the impact zone(s) 901A-D of the safety pad 910 associated with the first and second climbers can be designed according to attributes of the particular climber (e.g. considering corresponding impact attributes). And, as such, increased enjoyment of climbing vicinity between two or more climbers of different climbing abilities are enabled, and safety enjoyed, with increased social value.

Due to this increased social value, social recordings can similarly be made by simultaneous image and/or audio capture of both climbers along the climbing experience. For example, one or more video and/or audio recording devices 990A-G can be disposed along, and adjacent to routes A-D so as to simultaneously capture and record the climbing experience of any climbers scaling routes A-D. The capture devices 990 can be located so as to capture a perspective view of the climbers and the capture devices 990 can be disposed at predetermined locations based on perspective or identified challenges associated with the particular routes A-D. In some instances the video and/or audio capturing devices 990 can be located along the climbing routes A and B of the first and second climbers. The routes A and B of the first and second climbers can include climber proximity sensors that sense the proximity of each climber to the recording devices 990A-E. The proximity sensor, such as a camera or motion sensor, can be included in the capture devices 990. Once both climbers are within a vicinity (or field of video capture) of the recording devices 990 the video and/or audio recording of both climbers can be recorded with both climbers together within the image capture frame of the capture device 990.

In addition, the video and/or audio capture of one or more climbers can be accomplished using an aerial vehicle 995 having an audio and/or video capture device disposed thereon. The aerial vehicle 995 can be an aerial drone 995 with an audio and/or video capture device disposed upon the drone 995 with wireless proximity sensing device disposed upon the drone. Regarding the wireless proximity sending device, both the first and/or second climbers can wear a proximity transmitting device in communication with the proximity sensing device associated with the aerial recording vehicle 995.

In some embodiments, the aerial recording vehicle 995 can sense the proximity of both climbers and determine an optimized aerial recording position relative to both climbers. For example, the aerial vehicle 995 can consider a position which captures video imagery of both climbers within a certain threshold of desired margins of the recorded frame boundary. For example, the recorded capture can consider a center point between both climbers as a center point of a desired recording. The aerial vehicle can use a leveling sensor and position sensor of the aerial vehicle to optimize recording of the first and second climbers. An optimized boundary may be considered to ensure an appropriate distance between both climbers and a periphery of the capture view. And, the aerial location of the aerial vehicle 995, and/or control of the image capture device upon the aerial vehicle 995, can be determined so as to capture an optimized recording of the first and second climbers as they negotiate their particular climbing routes A and B.

In some embodiments, the aerial vehicle 995 (or multiple aerial vehicles) can include at least two coordinated audio and/or video recording devices. These recording devices can be in coordination with one another and assigned a particular one of the first or second climbers. The images recorded by each of the first and second recording devices can be rectified with respect to one another. For example, an image taken by a first recording device regarding a first climber can be rectified and coordinated with a recording of the second climber made by a second recording device. Where the recording of the first climber becomes unduly distanced from the second recording of the second climber, the recording of the first climber can be automatically isolated from the recording of the second climber and no longer rectified or coordinated together. For example, where the first climber's location differs from the second climber less than ten feet the recording of the first and second climbers can be presented together whether by a single capture of both climbers together or by a coordination of two separate recordings. Once the distance between the two climbers increases beyond a particular predetermined amount, the recording of each climber can be automatically reassigned to an independent recording thereof by individual cameras disposed on the one or more aerial vehicles. Then, when the vicinity of the climbers to one another becomes less than the predetermined distance, the separate recordings thereof can once again be coordinated or switched to a common dual climber recording device. And, rectifying transmitters or features 996, such as recognizable light transmitter (e.g. by polarization or light modulation) can be sensed and used to rectify adjacent images using sensing of the locations of the identifiable transmitters 996.

The use of the aerial vehicle 995, such as a drone, has advantages to various other static-based recording apparatus. For example, a climber-mounted recording device such as a GOPRO does not provide an exciting later review of the same perspective. Rather, the GOPRO is captures from the same position upon the climber from which it is held.

Similarly, a land-mounted recording device is held to a perspective from which it is located or constraints of the mount to which it is attached. And, as an aerial vehicle is not generally held to a three dimensional location, a wide array of recording positions are thereby enabled including vertical and lateral distance locations to simultaneously the first, second, and/or both climbers. Similar advantages can also be considered with respect to athletes enjoying other sports than climbing as well.

FIGS. 10A and 10B illustrate a control method for controlling an unmanned aerial vehicle (UAV) 1000 for recording imagery 1010 of a climber 1015 on a climbing surface 1005. The imagery 1010 of the climber 1015 can be controlled and captured while the climber 1015 ascends, remains suspended from, works on a problem, or encounters a problem 120A-D of the climbing surface 1005 or while the climber 1015 performs a task thereon. The method includes receiving distance signals from one or more distance sensors of the UAV 1000 describing the climbing surface 1005. The distance sensors can be a laser scanning LIDAR system, sonar, or other distance measurement sensor for measuring a distance D from the climbing surface 1005. The distance D can be a direct horizontal distance and can include a scan over the vertical surface in the X, Y, and/or Z direction so as to identify a plane, point, and/or line of the vertical surface 1005. Other more complicated climbing surfaces can be used as disclosed herein or would be known to one of ordinary skill in the climbing and mountaineering arts The scan can include identification of at least three surface points from the vertical climbing surface 1005, the at least three points measured by the UAV 1000 lie on a common plane of the climbing surface 1005 and are not collinear in that they vary in the horizontal and vertical plane of the portion of the climbing surface 1005 scan by view 1010, for example, so as to recognize a physical vertical and horizontal plane, point, and/or line of the climbing surface 1005.

The vertical plane 1030 of the climbing surface 1005 recognized by scanning the view 1010 of the climbing surface 1005 can be a three-dimensional model of the plane 1030 averaging the surface X direction distances of the vertical climbing surface 1005 as calculated from the UAV using a scan angle and distance therefrom similar to calculation of an altitude from a scanning airborne LIDAR system except that the scanning from the UAV is directed horizontally from the UAV to the climbing surface 1005. For example, where the surface 1030 of the climbing surface 1005 varies due to problems, the climber, or derivations in surface properties, sections, inclines, etc. an averaged or extrapolated surface plane 1030 model can be created with a max, min, and mean calculation. Thus, as shown in FIGS. 10A and 10B, the UAV 1000 scans the vertical surface 1005 and recognizes a vertical surface plane 1030 of a section defined by the surface plane 1030 of the climbing surface 1000 thereby determining a horizontal and vertical plane 1030 describing the actual climbing surface 100.

The UAV 1000 can then identify a normal 1025 to the plane 1030. The normal 1025 to the plane 1030 is a line perpendicular to the plane 1030 directly to the UAV 1000. The normal 1025 from the plane 1030 to the UAV 1000 can be determined by receiving a signal describing a vertical and horizontal position of the climber 1015 while the climber 1015 ascends the wall 1005 at which the height H of the UAV 1000 is maintained. The position of the UAV 1000 can be maintained at a distance D normal to the plane 1030 describing the climbing surface 1005 and relative to the horizontal and vertical position 1020 of the climber 1015. Thus, at this height H, distance D, and position 1020 of the climber 1025 the UAV 1000 records the imagery 1010 of the climber 1015 as the climber 1015 ascends the climbing surface 1005.

The horizontal and vertical plane 1030 describing the climbing surface 1005 is substantially parallel to gravity in the Z direction at the location of the UAV 1000. A signal from the one or more distances includes a description of at least three points on the climbing surface 1005 that define the horizontal and vertical plane 1030 describing the climbing surface 1005 in the Y and Z directions, the Z direction being parallel to gravity (g) and the Y direction being perpendicular to the normal 1025 in the X direction and a horizontal Y direction.

The one or more distance sensors of the UAV 1000 can include a light-based distance measurement sensor, such as a LIDAR system. The one or more distance sensors of the UAV 1000 can include a LIDAR system can include an angular measurement system that measures and angle at which light is transmitted from the UAV 1000 to the climbing surface 1005 and calculates a distance D to the surface therefrom. From these distances D, the normal 1025 can be determined as the closest horizontal distance to the climbing surface 1005. The horizontalness of a scan can be determined as being perpendicular to gravity in the Z direction. The Z direction can be a vertical direction in the case of the climbing surface 1005 of FIGS. 10A and 10B.

The UAV 1000 can include one or more distance sensors include a sound-based distance measurement sensor. The sound-based distance sensor can include a SONAR sensor for determining a distance D to the climbing surface.

The signal of the UAV 1000 can describe the vertical and horizontal position of the climber 1015 while the climber 1015 ascends the climbing wall 1005. This location 1020 of the climber 1015 describes the location of a vertical and horizontal transmitter 1020 worn by the climber 1015 also defining the position 1020 of the climber. The signal describing the vertical and horizontal position 1020 of the climber 1015 while the climber 1015 ascends the climbing wall 1005 can also include a recognized position 1020 of the climber 1015 from image analysis of the recorded imagery 1010.

The distance D normal 1025 to the plane 1030 describing the climbing surface 1005 is modified based on a signal received by the UAV 1000 so as to record a larger portion of the climbing surface 1005 surrounding the climber 1015 as illustrated in FIG. 10B.

A second signal can be received by the UAV 1000 describing a vertical and horizontal position of an additional climber (not shown) while the two or more climbers 1015 ascend the climbing wall 1005 spaced from one another. Based on the imagery 1010 desired to capture both climbers 1015, the UAV 1000 can be repositioned at a different distance D normal 1025 to the plane 1030 describing the climbing surface 1005 so as to capture both climbers 1015 and equidistance (e.g. centered vertically and horizontally at an increased distance) relative to the horizontal and vertical positions of both of the climbers 1015. Thus, at this reposition, the UAV can record the imagery of both of the climbers 1015 as the climbers 1015 ascend the climbing surface.

Figure 11B:
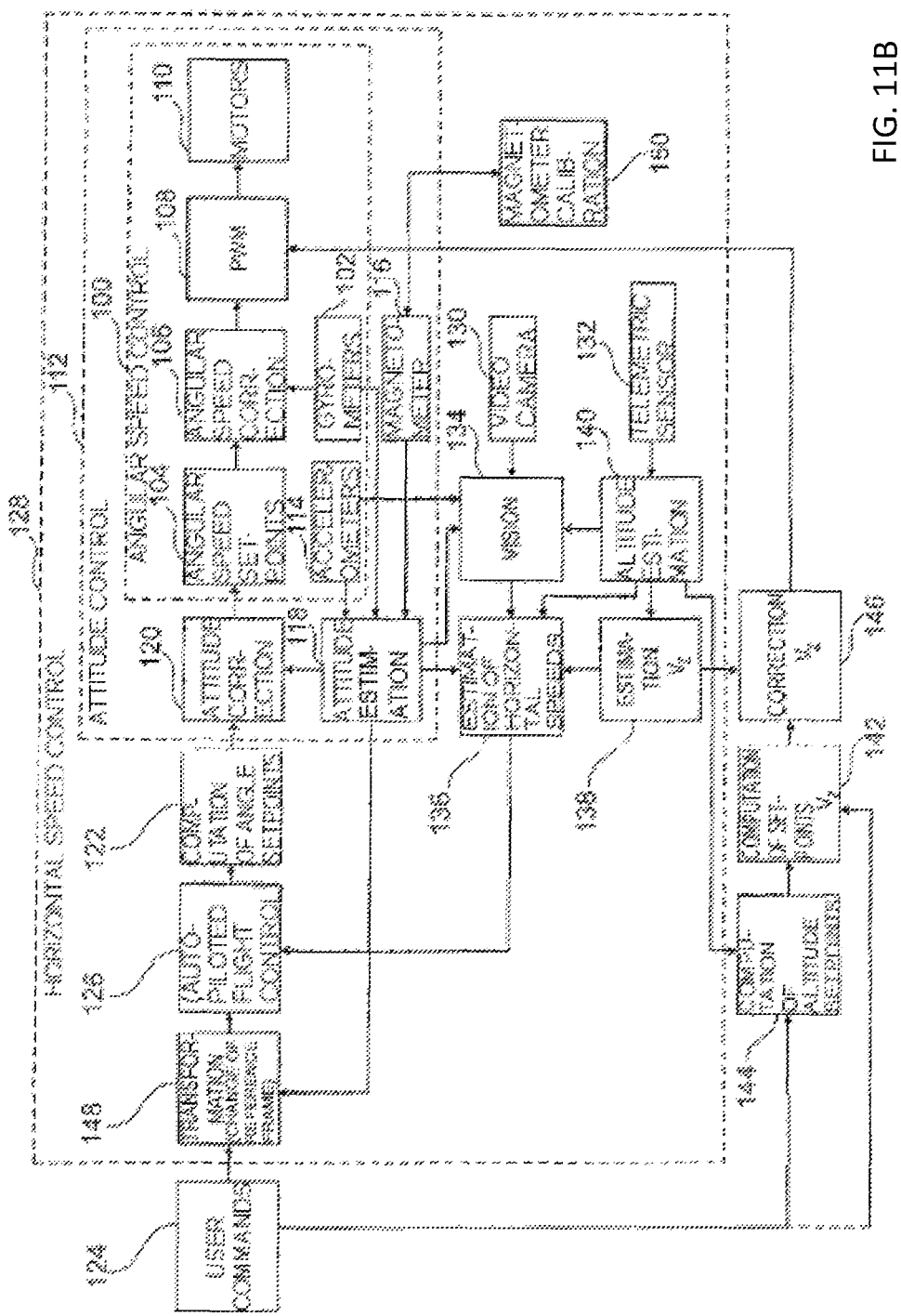

A UAV is illustrated in FIGS. 11A and 11B, which illustrate the control and function of the UAV 10 from a graphical user interface in the form of a smart phone. Certain figures and related conventional features are disclosed in U.S. Pat. No. 8,594,862, the contents of which are incorporated herein by reference. The reference 10 designates, generally, an example of a drone, which is for example a quadricopter such as the AR.Drone model from Parrot SA, Paris, France, described notably in WO 2010/061099 A2 and EP 2 364 757 A1 mentioned above, as well as in WO 2009/109711 A2 (which describes an exemplary automatic stabilization system based on information supplied by an altimeter and a front-viewing camera) and FR 2 915 569 A1 (which notably describes the control system with gyrometers and accelerometers used by the drone). Each of these documents are incorporated herein by reference.

This example of a drone 10 comprises four coplanar rotors 12, whose motors are piloted independently by an integrated navigation and attitude control system. It is provided with a front-viewing first camera 14 that makes it possible to obtain an image of the scene towards which the drone is directed, for example a wide-angle camera with CMOS sensor. The location of the first camera 14 or a sensor can form the point from which a normal is measured or determined. The drone also comprises a vertical-viewing second camera (not represented) pointing downward, suitable for picking up successive images of the terrain being flown over and used notably to evaluate the speed of the drone in relation to the ground.

Inertial sensors (accelerometers and gyrometers) make it possible to measure with a certain accuracy the angular speeds as discussed herein and the attitude angles of the drone 10, that is to say the Euler angles describing the inclination of the drone 10. An ultrasound range finder arranged under the drone 10 also supplies a measurement of the altitude in relation to the ground. Similarly, an ultrasound range finder can be used to locate the vertical surface. As for the linear translational speed of the drone 10, the latter is evaluated by analysis of the image supplied by the vertical-viewing camera of the drone 10 in combination with the accelerometric data, by virtue of software which estimates the displacement of the scene picked up by the camera from one image to the next and applies to this estimated displacement a scale factor that is a function of the measured altitude.

The drone 10 is piloted by a remote control apparatus 16 provided with a touchscreen 18 displaying the image taken by the front-mounted camera 14, with, superimposed, a certain number of symbols making it possible to activate the piloting commands by simple contact by the finger 20 of a user on the touchscreen 18. The apparatus 16 is provided with radio link means with the drone 10 for the bidirectional exchange of data from the drone 10 to the apparatus 16, notably for the transmission of the image picked up by the camera 14, and from the apparatus to the drone 10 for the sending of piloting and/or video capture commands. This link can, for example, be of Wi-Fi (IEEE 802.11) or Bluetooth (registered trademarks) local area network type.

The apparatus 16 is also provided with inclination sensors 34 making it possible to control the attitude of the drone 10 by transmitting to the apparatus 16 corresponding inclinations according to the roll and pitch axes (reference can be made to WO 2010/061099 A2 mentioned above for more details on these aspects of the system).

The remote control apparatus 16 can include any hand-held and/or a head mounted input device or a combination thereof. The hand-held input device 16 can include a telephone or portable multimedia device with touchscreen and integrated accelerometer, for example a cellular telephone of iPhone type, a portable device of iPod Touch type or a multimedia tablet of iPad type, which are apparatuses that incorporate the various control members necessary for the display and the detection of the piloting commands, for the viewing of the image picked up by the front-mounted camera, and for the bidirectional exchange of data with the drone by Wi-Fi or Bluetooth link. The input device 16 can also communicate with a head-supported input device (e.g. see FIG. 13 discussed below) in the form of glasses or goggles (e.g. VR goggles) displaying a view from camera 14.

FIG. 11B is a block diagram of the various control, servo control and assisted piloting members of the drone. FIG. 11B further illustrates a functional block diagram of the various control and servo control members of a UAV. It will be noted that, although this diagram is presented in the form of interconnected circuits, the implementation of the various functions is essentially software, this representation is solely illustrative.

The piloting system involves a number of nested loops, for the control of the horizontal speed, of the angular speed and of the attitude of the drone, in addition to the control of the altitude variations automatically or under the effect of a command from the user.

The most central loop, which is the loop 100 for controlling the angular speed, uses, on the one hand, the signals supplied by the gyrometers 102 and on the other hand a reference consisting of the angular speed setpoints 104, these various information items being applied as input for an angular speed correction stage 106. This stage 106 pilots a stage 108 for controlling the motors 110 in order to separately control the speed of the different motors to correct the angular speed of the drone by the combined action of the rotors driven by these motors.

The angular speed control loop 100 is nested in an attitude control loop 112, which operates on the basis of the information supplied by the gyrometers 102, accelerometers 114 and a magnetometer 116, these data being applied as input for an attitude estimation stage 118 of non-linear merging type equivalent to a complementary filtering. The stage 118 delivers angular speed setpoints applied to an attitude correction circuit 120 of PI (proportional-integral) type, which also receives angle setpoints generated by a circuit 122 from user commands 124 which are either directly applied to the circuit 122, or modified or replaced by automatic piloting commands generated by a circuit 126, notably in automatic stabilization mode or during autopiloted transition phases.

Thus, from the error between the setpoint (applied by the user or else generated internally in the case of automatic piloting) and the measurement of the angle given by the attitude estimation circuit 118, the attitude control loop 112 calculates an angular speed setpoint using the PI corrector of the circuit 120. The angular speed control loop 100 then computes the difference between the preceding angular speed setpoint and the angular speed actually measured by the gyrometers 102. It then computes, from these information items, the different rotation speed setpoints (and therefore lift force setpoints) to be sent to the motors 110 of the drone to produce the maneuver initially requested by the user, or else scheduled by the automatic pilot.

For the control of the horizontal speed, notably in autopiloted operation, a loop 128 implements a vertical video camera 130 and a range-finding sensor 132 serving as altimeter, which produce information applied to a circuit 134 also receiving the data obtained from the gyrometers 102 to apply the necessary corrections to the estimation of the horizontal speed, given by the circuit 136. This estimation of the horizontal speed can be corrected by estimation of the vertical speed VZ, given by the circuit 138 from an altitude estimation supplied by the circuit 140 receiving the information from the range-finding sensor 132.

For the autopiloted flight, the horizontal speed estimated by the circuit 136 makes it possible for the circuit 126 to compute speed setpoints which will then be applied as input for the attitude control loop 112 after transformation into angle setpoints by the circuit 122, to progressively bring the drone to a stop then hold the latter in a configuration with zero speed and inclination.

With regard to the vertical displacements of the drone, the user 124 applies either a lift speed setpoint Vz directly to a circuit 42, or an altitude setpoint to a circuit 144 which computes, from the altitude estimation produced by the circuit 140, a lift speed setpoint applied to the circuit 142.

In one or other case, the lift speed (prescribed or computed) is applied to a circuit 146 comparing the setpoint lift speed VZ with the estimated corresponding speed, given by the circuit 138. This circuit 146 accordingly modifies the command data for the motors (circuit 108) so as to increase or reduce the rotation speed simultaneously on all the motors so as to minimize the difference between setpoint lift speed and measured lift speed.

Finally, and in a manner characteristic of the invention, a circuit 148 applies a change of reference frame to realign the specific reference frame of the drone on the specific reference frame of the apparatus.

More specifically, in the conventional piloting technique without realignment of the reference frame of the drone on that of the apparatus, that is to say in "immersive piloting" mode, the command takes the form:

$$(\theta d \varphi d) = (\theta I \varphi I)$$

θd and φd being the setpoint Euler angles of the drone in its specific reference frame, and θI and φI being the Euler angles of the apparatus.

In other words, the setpoint angles of the drone correspond to the angles characterizing the attitude of the apparatus in its reference frame.

Here, and hereinbelow, these equalities are obviously given within a possible amplification factor, and with possible limitations of maximum inclination in one direction or in the other to avoid any command exceeding the physical capabilities of the drone.

As discussed, an unmanned aerial vehicle (UAV) for surveillance of a substantially vertical climbing surface can include a video camera and multiple sensors for controlling piloting, filming, communications, and coordination of the UAV. The UAV can include multiple rotary motors coupled to propellers for positioning the UAV at multiple different horizontal and vertical positions relative to the substantially vertical climbing surface. The UAV can include the one or more sensors for determining a vertical direction that is parallel to the direction of gravity at a location of the UAV. The vertical direction also defining a parallel substantially vertical direction Z of the climbing surface. The one or more distance sensors can configured to sense at least three non-collinear surface points of the climbing surface.

Referring to FIGS. 10A-10B, computing software (e.g. of the UAV illustrated in FIGS. 11A and 11B) can include computer executable instructions written in code, download, and/or stored, compiled, and executed to determine a substantially vertical plane of the climbing surface 1005. The substantially vertical plane including the at least three non-collinear points of the climbing surface. The substantially vertical plane 1030 extending substantially parallel to the vertical direction Z of the climbing surface 1005 and extending in a horizontal direction Y that is perpendicular to the vertical direction Z of the climbing surface 1005;

The computing software can determine a vertical position 1020 of a climber 1015 with respect to the climbing surface 1005. And, the piloting, control, and/or (re)positioning of the UAV 1005 can be controlled by the software, or in coordination with ground-based software and/or control, so as to vertically (Z) and horizontally (Y) reposition the UAV at a distance (X) normal 1025 to the substantially vertical plane 1030 of the climbing surface 1005 and relative to the horizontal (Y) and vertical (Z) position 1020 of the climber 1015.

The computing software can include storage means (e.g. including instructions stored on RAM and/or ROM) for determining an initial distance D from the UAV 1000 to the climbing surface 1005. The computing software can include instructions for initially stabilizing an initial airborne position (e.g. H1) of the UAV 1000 with respect to the climbing wall 1005 at a predetermined height H1 from ground and at the initial distance D from the UAV 1000 to the climbing surface 1005.

FIGS. 12A-12E illustrate a control method for controlling an unmanned aerial vehicle (UAV) 1200 for recording imagery of a climber (not shown) described by a point normal P on a climbing surface 1205. The imagery of the climber located at point normal P can be controlled and captured while the climber ascends, remains suspended from, or encounters a problem of the climbing surface 1205 or while the climber performs another task thereon. The climbing surface 1205 may be non-uniform in horizontal Y direction, vertical Z direction and/or distance X directions. However a gravitation direction g in the vertical direction Z is known from a sensor of the UAV 1200, such as a gravity sensor.

The gravity sensor measures the acceleration effect of Earth's gravity on the UAV 1200 enclosing the sensor. It can be derived from an accelerometer, where other sensors (e.g. a magnetometer and a gyroscope for example) can help to remove linear acceleration from data. The gravity units can be in $m/s^2$ like an accelerometer, and they can be measured along the X, Y, and Z axes.

The source of gravity acceleration is, of course, the gravity pull of the Earth. Therefore, when the gravity sensor discloses the X,Y,Z components of the sensed gravity g, the tilt of the UAV 1200 can be calculated relative to the face of the Earth. The physical sensor of the UAV 1200 can include an accelerometer. The accelerometer of the UAV 1200 can measure all the accelerations that affect the UAV 1200 and can work in cooperation with other sensors of the UAV 1200 to determine, control, and rectify attitude, change in position, angular direction, etc. These sensors can be used to perform various auto-pilot or initial/subsequent programmed routines as described herein. Such routines can be originally written, programmed, downloaded, or otherwise executable software. A low-pass filter technique can be used to determine (e.g. at least initially) device tilt using the accelerometer. The UAV 1200 can also use refined gravity g measurement by creating a virtual sensor that is implemented as a sensor-fusion of several basic physical sensors, the accelerometer, a gyroscope, and a magnetic sensor for example. Various sensors and configurations can be used to obtain initial and/or refined gravity g, tilt (e.g. 22/24 in FIG. 11A), and position readings and signals.

Distance signals can be from one or more distance sensors of the UAV 1200 describing the climbing surface 1205. The distance sensors can be a laser scanning LIDAR system, sound, or other distance measurement sensor for measuring a distance D from the climbing surface 1205. The distance D can be a direct horizontal distance and can include a scan over the vertical and/or horizontal surface in the X, Y, and/or Z direction so as to identify, characterize, or estimate a plane, point, and/or line of the vertical surface 1205.

Figure 12C:
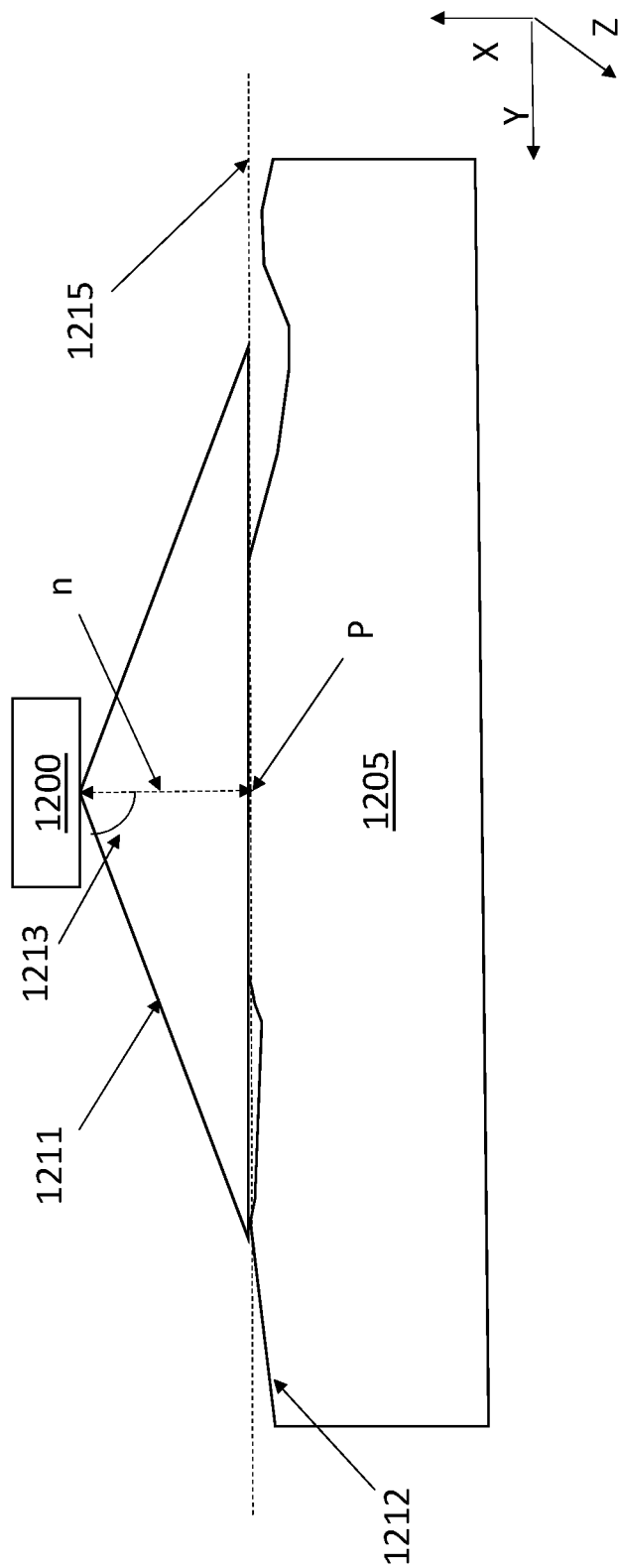

According to the example shown in FIGS. 12A-E, the scan can include identification of a horizontal line 1215 describing the vertical climbing surface 1205 at a height H. The height H1 can be a height of the UAV 1200 or a height H1 of a sensor of the UAV 1200 as illustrated in FIG. 12B defined by a normal point P. The normal point P can be a point on the climbing surface 1205 at a height H1 that is normal to a plane defined by the horizontal line 1215 and the vertical line 1210 defined by gravity g. The vertical line 1210 describes gravity g and the horizontal line 1215 can approximate a parallel surface line 1215 describing the climbing surface 1205 at the height H1 in the Y direction. As shown in FIG. 12C, the horizontal line 1215 an approximate an uneven surface 1212 of the climbing surface 1205 in the Y direction and the normal n can be defined by a normal to the line 1215 and the force of gravity g at the point P.

Estimation of a line (e.g. 1215/1210, point P, and/or plane 1206) describing the climbing surface 1105 can be similarly approximated to the illustration of FIG. 12C according to the descriptions herein. Thus, any line, point, and/or plane can be an average, normalization, or approximation from one or more points of a surface or sensor reading as illustrated by horizontal line 1215 of climbing surface 1205 in FIG. 12C. Thus, the horizontal line 1215, normal n to the horizontal line 1215 and gravity g direction in the Z direction (into FIG. 12C) can illustrate the relative directions for sensing a climber on climbing surface 1205 and controlling the altitude (e.g. H1 or H2), tilt, direction, distance (e.g. D) and other control parameters of the UAV 1200 as described herein. Such estimations of lines and points can further estimate virtual descriptive planes 1206 as such points and lines, and vice versa.

Figure 12E:
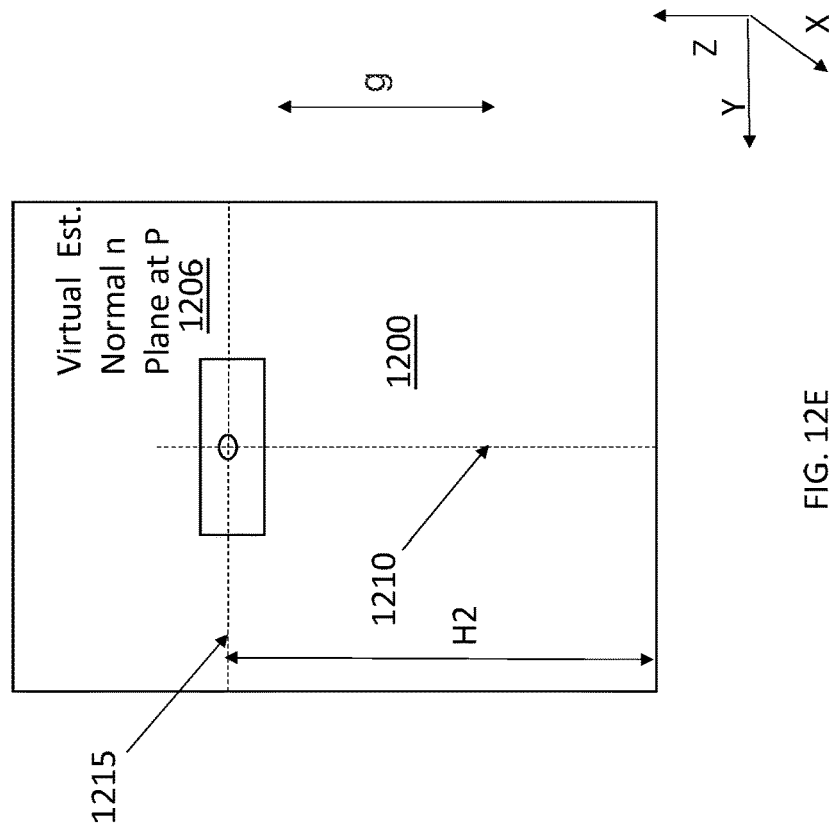
Figure 12D:
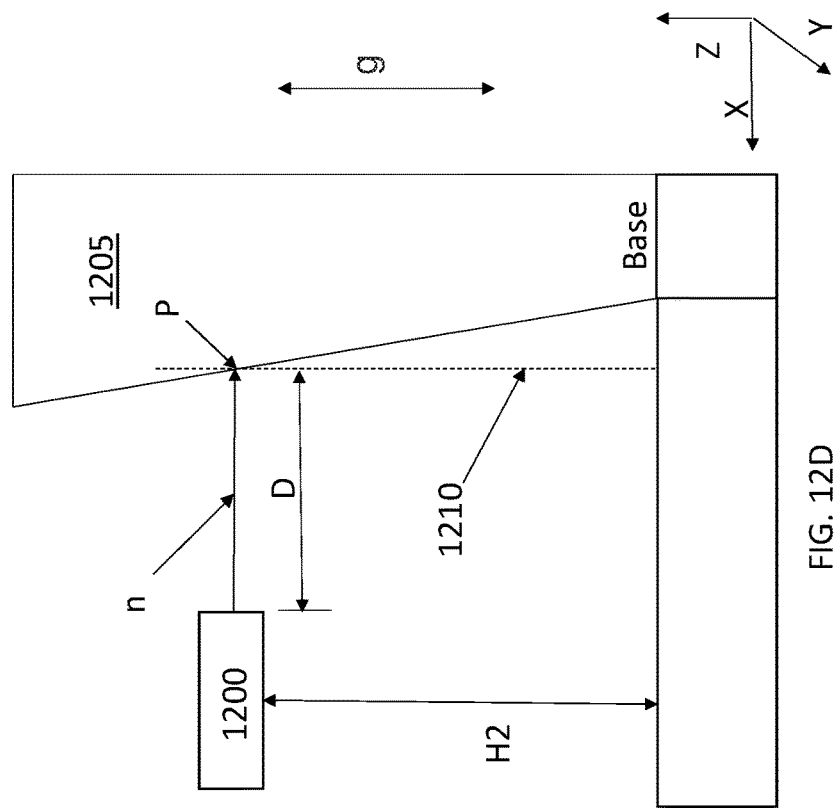

For example, turning to FIGS. 12D and 12E, the UAV 1200 has been repositioned in height H2 relative to FIGS. 12A and 12B. That is, the height (or altitude) H2 above ground level has been increased. In this example, the wall is not (e.g. entirely) vertical as shown. However, the distance D can be set and maintained in this example, or otherwise controlled/modified according to a criteria in other examples.

In the example of FIGS. 12D and 12E, the position of the point P has been moved upon the climbing surface 1205 upwards. Similarly, the horizontal position of the point P has been moved to the left (up the overhang) in FIG. 12D. However the distance D has been maintained so as to maintain a distance D of the UAV 1200 from the point P. In the instance where the point P is defined by a climber of the climbing surface 1205, the point P can be a recognized position of the climber at point P as previously described. The point P can be recognized by a transmitter or beacon attached to the climber at point P and the distance D can be maintained so as to maintain a video recording capture attribute of the UAV 1100 relative to the climbing surface 1205 at different heights H1, H2, and H(N)(not shown). For example, the distance D in FIGS. 12A and 12B can be the same distance D in FIGS. 12D and 12E so as to maintain the recording attributes of the climber at point P by the UAV 1200 at deferent locations relative to the climbing surface 1205 or according to other criteria or climbing surface 1205 attributes. For example, as the climber increases the height H, the distance D can change correspondingly. Similar control and piloting routines can be performed by the UAV 1200 and/or in coordination with a ground signal with regards to changes in horizontal position of the climber at point P.

The horizontal line 1215 of the climbing surface 1205 recognized by scanning the view 1211 (FIG. 12C) of the climbing surface 1205 can be a two dimensional model, for example, describing the horizontal surface 1212 by the line 1215 averaging the surface 1212 X direction distances of the climbing surface 1205 as calculated from the UAV 1200 using a scan angle 1213 and distance D in the X direction therefrom similar to calculation of an altitude from a scanning airborne LIDAR system except that the scanning from the UAV 1205 is directed horizontally in the Y from the UAV 1200 to the climbing surface 1205. For example, where the surface 1212 of the climbing surface 1205 varies (e.g. due to problems, volumes, or naturally occurring outdoor variations), the climber, or derivations in surface properties, sections, inclines, etc. an averaged or extrapolated surface line 1215 model can be created with a max, min, and mean calculation. Thus, as shown in FIGS. 12A-12E, the UAV 1200 scans 1211 the horizontal line 1215 (or lines or combination of lines and planes) of the surface 1212 of the climbing surface 1205 and recognizes a horizontal surface line 1215 of a section defined by the surface 1212 of the climbing surface 1205 thereby determining a horizontal line 1215 describing the actual climbing surface 1205. This horizontal line 1215 in the Y direction is perpendicular to the direction of gravity g in the Z direction and defines the normal n at the height/position P of the UAV 1200. The UAV maintains, or controls, the distance D from the point P at the position of the normal n and maintains this position relative to point P. The point P can change due to repositioning of the climber or based on input received by the UAV 1200 using the position of point P as feedback or other control/piloting constraint.

The UAV 1200 can then identify the normal n to the virtual plane 1206 created by the horizontal line 1115 and the direction of gravity at the point P. The normal n to the planed defined by the perpendicular lines of the horizontal line 1215 in the Y direction and the direction of gravity g in the Z direction is a normal line perpendicular to the this plane 1206 directly to the UAV 1200 at its elevation H. The normal n from lines 1215 and g creating the plane to the UAV 1200 can be determined by receiving a signal describing a vertical and horizontal position P of the climber (e.g. 1015 in FIG. 10B) while the climber ascends the climbing wall 1205 at which the height H of the UAV 1200 is maintained. The position of the UAV 1200 can be maintained at a distance D normal n to the direction of gravity g and/or horizontal line 1215 describing the climbing surface 1205. Thus, at this height H, distance D, and position P of the climber to the UAV 1200, the UAV 1200 records the imagery of the climbing surface 1200.

Figure 13C:
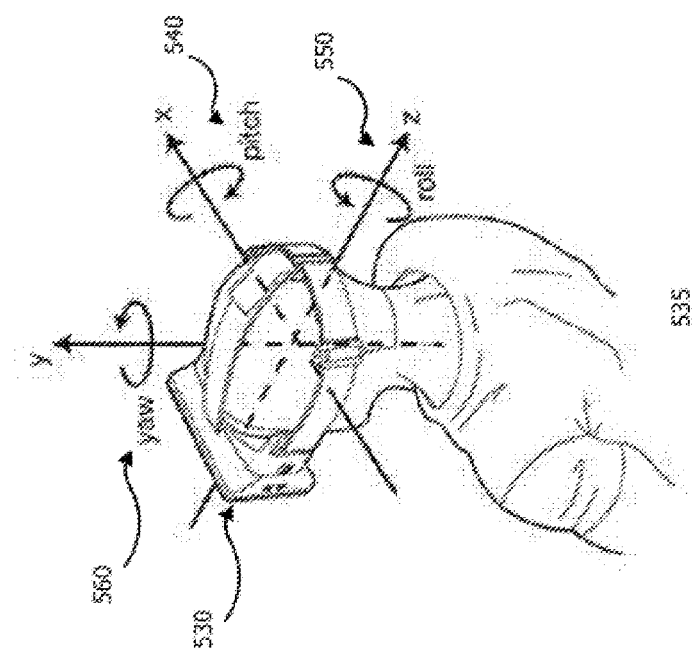

With cross-reference to FIGS. 13A and 13C, a user 535 wearing a virtual reality headset 530 is shown. The VR headset 530 is worn over the eyes of user 535. The user 535 head may be considered at the center of a three-dimensional axis with axes of pitch 540, roll 550 and yaw 560. Pitch 540 is an x axis, roll 550 is a z axis and yaw 560 is a y axis in a three-dimensional Cartesian coordinate system. The virtual reality headset 530 can be referred to as belay goggles when used in connection with a UAV as disclosed herein.

Movement of the VR headset 530 (user movement) may be expressed as pitch 540, roll, 550 and yaw 560. One method for expressing a three-dimensional orientation uses quaternions. This is because any three-dimensional orientation can be represented by a quaternion expressed in the form $q(v,\theta)=(\cos(\theta/2), vx\sin(\theta/2), vy\sin(\theta/2), vz\sin(\theta/2))$ in which $q(v,\theta)$ represent the same rotation. Quaternions have the benefit of enabling manipulations of rotations with relatively few parameters while preserving geometry (for example, the Haar measure) under algebraic operations, which is very useful for performing prediction in three-dimensional space.

The Haar measure helps to ensure that multiple rotations of an object in three-dimensional space remain related to one another. For example, applying a third rotation to two earlier rotations would, preferably, result in those two earlier rotations still being separated by the same distance. Maintaining consistency with respect to the Haar measure helps to ensure this and functions well in conjunction with quaternions When these piloting commands are applied by the user from the remote control apparatus according to the known piloting mode, the commands a) and b) for pivoting about pitch 22 and roll 24 axes are obtained by inclinations of the apparatus 16 respectively about its longitudinal axis 32 and its transverse axis 34: for example, to make the drone move forward, it is sufficient to incline the apparatus forward by tilting it about the axis 32, to shift it to the right, it is sufficient to incline the apparatus by tilting it about the axis 34 to the right, and so on.

Referring to FIGS. 13A-D, the UAV 1300 also has an automatic and standalone system for stabilization in stationary flight, corresponding to an autopiloted mode activated notably as soon as the a user 540 indicates an auto pilot or initial state, or even in case of interruption of the radio link between the apparatus 540/1525 and the UAV 1300. The UAV 1300 then switches to a lift state in which it will be immobilized and held in this fixed position by the automatic piloting and stabilization system, with no intervention from the user 535.

In this example, the user 535 can be referred to as a belay. The belay can be performing observation or manual tasks associated or supervising the climber 1310. In this example, the belay 535 can be operating a rope 1330. The rope in this example can be a top rope in the instance that the climber 1310 is not bouldering as previously discussed. The belay 535 may also be operating other devices such as a piloting or observation display device 1325/1330/1350 for providing supervising suggestions to the climber 1310.

The UAV 1300 for surveillance of a substantially vertical climbing surface 1305 and a climber 1310 with a beacon 1315 in this example can include a video camera and multiple sensors for controlling piloting, filming, communications, and coordination of the UAV 1300. The UAV 1300 can include multiple rotary motors coupled to propellers for positioning the UAV 1300 at multiple different horizontal and vertical positions relative to the substantially vertical climbing surface 1305. The UAV 1000 can include the one or more sensors for determining a vertical direction that is parallel to the direction of gravity at a location of the UAV. The vertical direction also defining a parallel substantially vertical direction Z of the climbing surface 1305. The one or more distance sensors can be configured to sense at least three non-collinear surface points of the climbing surface 1305.

Computing software of the UAV 1300 can include computer executable instructions written in code, download, and/or stored, compiled, and executed to determine a substantially vertical plane of the climbing surface 1305 as previously discussed.

Figure 13D:
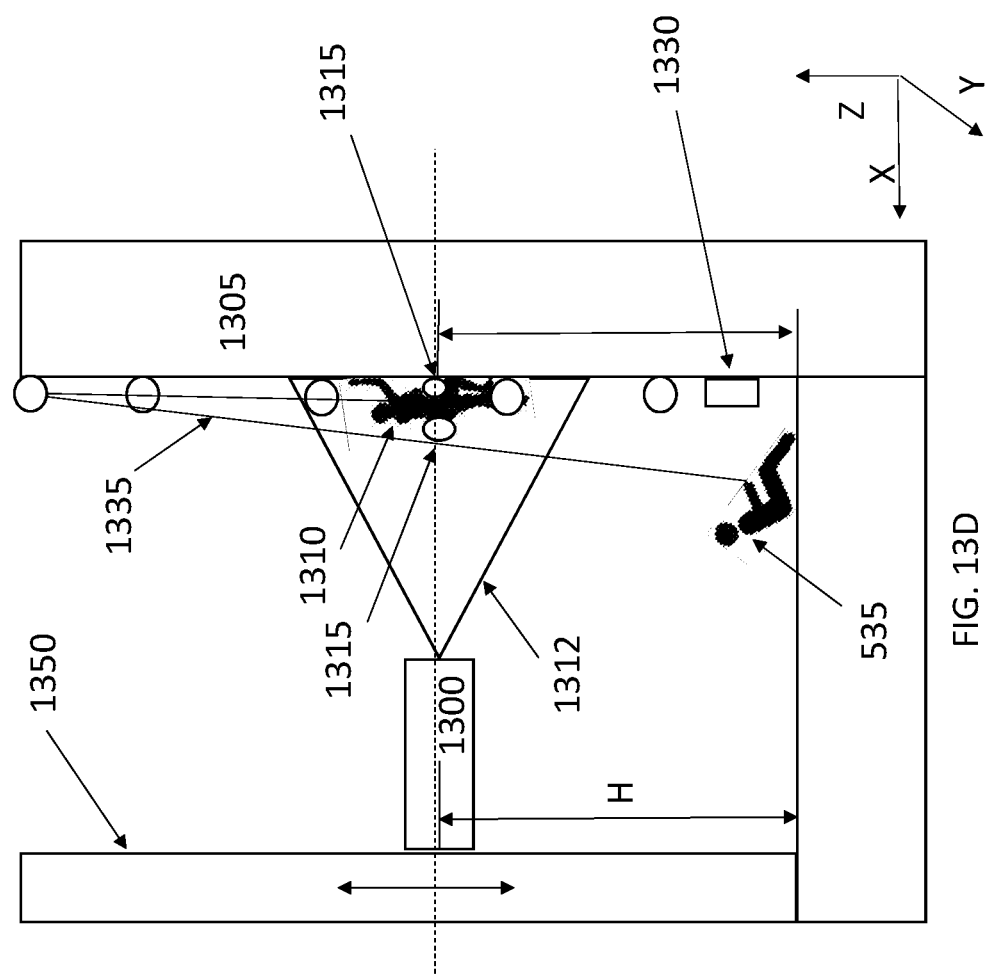

Referring to FIG. 13D, the UAV 1300 can be vertically disposed on a vertical carriage to correspond to the climbing surface 1305. The UAV 1300 can detach from the mount 1350 and be aerially navigated as opposed to the mechanical translation along the mount 1350.

Figure 14:
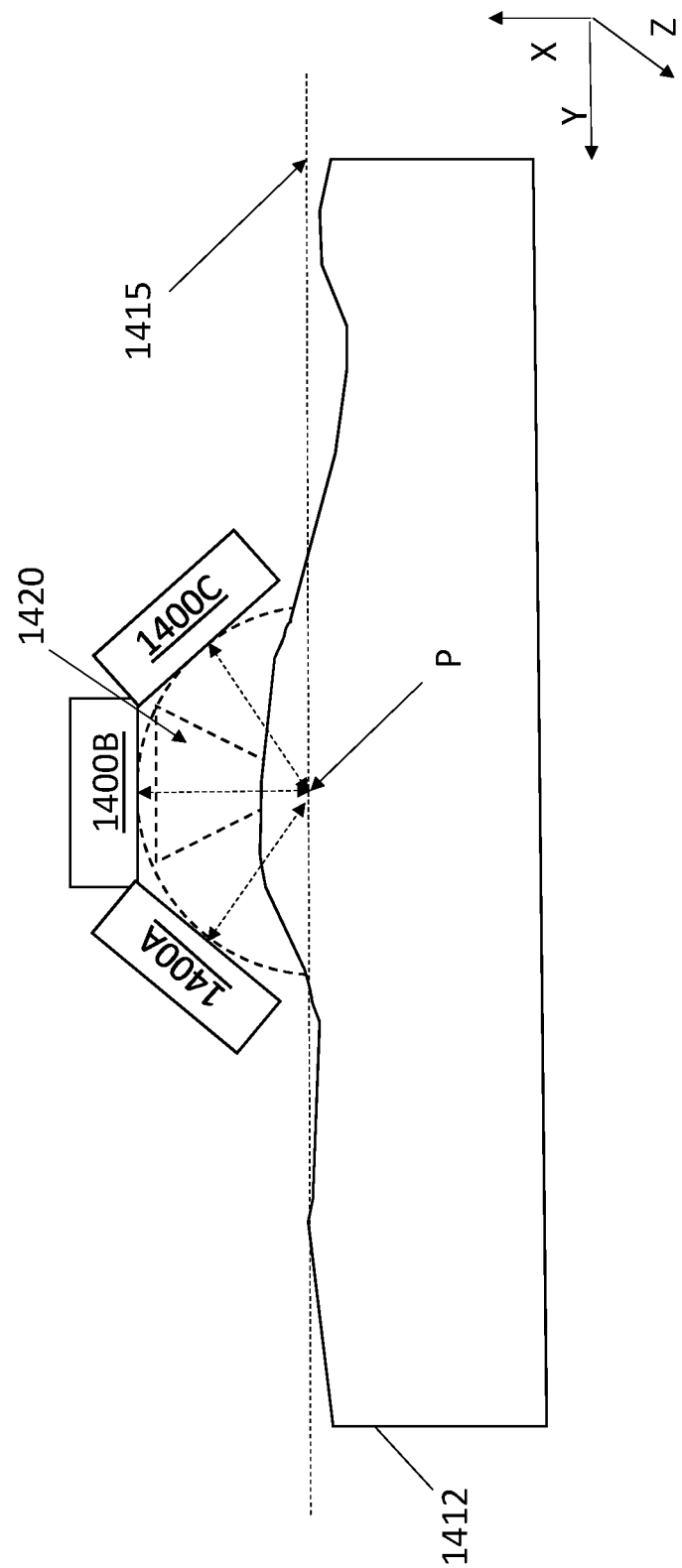
FIG. 14 illustrates methods for recording a climbing surface.

FIG. 14 illustrates a panning method of videography. The panning method includes use of the location point P as a pivot for motion of the UAV 1400. The UAV 1400 has three positions illustrated, 1400A, 1400B, and 1400C, but any number of positions around the pivot point P can be used. The pivot point P can be the point P previously discussed of the climber suspended from the wall and calculated therefrom. The pivot point P can be the location of the beacon. The pivot point can be limited by the existence of the wall where rotation about the pivot point P can be restricted to 180 degrees by the UAV thereof. The restriction of the UAV about the pivot point P can be about the X, Y, Z, direction, axis, or at an angle thereto. The axis of the panning can be restricted to less than 180 degrees so as to prevent the UAV from impacting the surface 1412. Restrictions of rotation of panning can be due to a level of non-uniformity of the surface 1412. The UAV 1400 can have a common point of direction for the camera of the UAV 1400. The direction of the UAV can also point towards the point P but the camera therein can be manipulated independent of the physical position of the UAV.

The positions A-C of the UAV can be a set of selectable positions relative to the point P of the climber. Sets of positions can be, for example, left, right, up, down and straight or increments thereof. The positions and increments can be varied in increments of 5 degrees, 10 degrees, 15 degrees, 30 degrees, 45, degrees or single degrees therebetween. One example, can include a straight or directly perpendicular (i.e. parallel to the normal) of 1400B A, respectively, at an angle of 45 degrees relative to the direct perspective of 1400B. Similarly, an up and down videography perspective relative to the direct perspective of 1400B can be defined by 45 degrees.

The UAV 1400 can be designed to move directly to the various positions or "pan" back and forth between positions relative to the direct position 1400B, the point P, the climbing surface 1412, and/or a virtual plane, line 1415, or point describing the surface 1412 as previously described.

Multiple UAVs can also be used to simultaneously record the activity at point P from different perspectives. For example, UAV 1400A can be a different UAV from 1400B, and/or 1400C. The positions of the different UAVs 1400 can be coordinated there between, from ground level, or due to a programming thereof. For example, as a climber ascends the climbing surface 1412, two or more UAVs 1400 can follow the climber up the surface and record the activity of the climber from the different perspectives 1400A-C. According to some embodiments, the rotation of panning can be restricted to between 45 degrees from opposing sides of the plane 1415 defining the climbing surface 1412. Thus, the movement of the UAV 1400 can be restricted between the position of 1400A and 1400C so as to restrict the movement from engaging the wall 1412. Similar distance measurement sensors can be used to ensure that the UAV 1400 does not impact the wall 1412 or to select a safe operation therefrom.

Similarly, various zones 1420 can be defined within the range of point P. In this example, a triangular flight zone or path can be defined and such zone can be a restricted flight zone. The flight zone can also define a path about which a panning or allowed trajectory of flight by the UAV is made. For example, the position 1400B may be allowed to be varied (e.g. allowed to encroach or get closed to P) so long as it does not invade the zone 1420. Similarly, where a physical portion of the UAV 1400A or 1400C invades the zone 1420, an alarm or restriction to such flight path or panning can be made.

One skilled in the art will appreciate that, for this and other processes and methods disclosed herein, the functions performed in the processes and methods may be implemented in differing order. Moreover, the structures of apparatus may be reorganized or variated used to accomplish a given feature or function. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 routes refers to groups having 1, 2, or 3 routes. Similarly, a group having 1-5 impact zones refers to groups having 1, 2, 3, 4, or 5 impact zones and more or less, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method performed by an unmanned aerial vehicle (UAV) for capturing imagery of a climber as the climber navigates a climbing surface, the method comprising:
receiving a signal from one or more distance sensors of the UAV describing the climbing surface;
determining a plane describing the climbing surface;
receiving a signal describing a position of the climber on the climbing surface; maintaining a position of the UAV at: a distance normal to the plane describing the climbing surface; and
relative to the position of the climber;
and capturing the imagery of the climber.

2. The method according to claim 1, wherein the plane describing the climbing surface is substantially parallel to gravity at the location of the UAV.

3. The method according to claim 1, wherein receiving the signal from the one or more distance sensors of the UAV describing the climbing surface describes at least three points on the climbing surface that define the plane describing the climbing surface.

4. The method according to claim 1, wherein the signal from the one or more distance sensors define a horizontal attribute of the climbing surface.

5. The method according to claim 4, wherein the horizontal attribute describes a horizontal line used with a vertical direction to define a virtual plane describing the climbing surface.

6. The method according to claim 5, the virtual plane defining a normal vector to the UAV.

7. The method according to claim 1, wherein the one or more distance sensors include a light-based distance measurement sensor.

8. The method according to claim 1, wherein the one or more distance sensors include a sound-based distance measurement sensor.

9. The method according to claim 1, wherein a signal describing the vertical and horizontal position of the climber while the climber navigates the climbing surface describes a location of a vertical and horizontal transmitter worn by the climber.

10. The method according to claim 1, wherein a point horizontal to a position of a beacon worn by the climber defines a normal vector used to pilot the UAV.

11. The method according to claim 1, wherein an accelerometer is used to define a virtual plane describing the climbing surface at the position of the climber.

12. The method according to claim 1, wherein a signal describing a vertical and horizontal position of the climber while the climber navigates the climbing surface includes a recognized position of the climber from image analysis of recorded imagery by the UAV.

13. The method according to claim 1, wherein the distance normal to the plane describing the climbing surface is modified based on a signal received by the UAV describing activity surrounding the climber or an altitude of the climber so as to record a larger portion of the climbing surface surrounding the climber.

14. The method according to claim 1, further comprising: receiving a second signal describing a vertical and horizontal position of an additional climber while both climbers ascend the climbing surface;
and repositioning the UAV at: a different distance normal to the plane describing the climbing surface to capture both climbers within imagery recorded and/or transmitted by the UAV; and
equidistance relative to the horizontal and vertical positions of both climbers; and
recording and/or transmitting imagery capturing both of the climbers as the climbers navigate the climbing surface.

15. An unmanned aerial vehicle (UAV) for surveillance of a climbing surface, comprising: a video camera;
multiple rotary motors coupled to propellers for positioning the UAV at multiple different horizontal and vertical positions relative to the climbing surface;
one or more sensors for determining a vertical direction that is parallel to the direction of gravity at a location of the UAV;
one or more distance sensors for sensing surface points of the climbing surface;
determining a plane describing the climbing surface, the plane: including the at least three non-collinear points; and extending substantially parallel to the climbing surface;
and or substantially parallel to the vertical direction of gravity and parallel to at least two horizontal surface points of the climbing surface;
determining a vertical position of a climber with respect to the climbing surface;
and controlling the UAV to vertically and horizontally reposition the UAV at a distance normal to the plane describing the climbing surface and relative to the horizontal and vertical position of the climber.

16. The UAV according to claim 15, determining an initial distance from the UAV to the climbing surface;
initially stabilizing an initial airborne position of the UAV with respect to the climbing surface at a predetermined distance from ground and at the initial distance from the UAV to the climbing surface.

17. The UAV according to claim 15, further comprising: a video transmitter configured to receive and transmit live video imagery from the video camera; and a video camera control system configured to receive video camera control signals, the video camera control signals operating the video camera to capture a scene of the climbing surface based on a position of a graphical user interface worn by the head of a person.

18. An unmanned aerial vehicle (UAV) for surveillance of a climbing surface, comprising: a video camera;
multiple rotary motors coupled to propellers for positioning the UAV at multiple different horizontal and vertical positions relative to the climbing surface;
one or more sensors for determining a vertical direction that is parallel to the direction of gravity at a location of the UAV;
one or more distance sensors for sensing surface points of the climbing surface; determining a plane describing the climbing surface, the plane: including the at least three non-collinear points;
extending substantially parallel to the vertical direction of gravity; and parallel to at least two horizontal surface points of the climbing surface; determining a vertical position of a climber with respect to the climbing surface;
and controlling the UAV to vertically and horizontally reposition the UAV at a distance normal to the plane describing the climbing surface and relative to the horizontal and vertical position of the climber.

19. The UAV according to claim 18, determining an initial distance from the UAV to the climbing surface;
and initially stabilizing an initial airborne position of the UAV with respect to the climbing surface at a predetermined distance from ground and at the initial distance from the UAV to the climbing surface.

20. The UAV according to claim 18, further comprising: a video transmitter configured to receive and transmit live video imagery from the video camera; and a video camera control system configured to receive video camera control signals, the video camera control signals operating the video camera to capture a scene of the climbing surface based on a position of a graphical user interface worn by the head of a person.

* * * * *